(12) United States Patent
Holsten-Stuehmer

(10) Patent No.: US 12,454,048 B2
(45) Date of Patent: Oct. 28, 2025

(54) WEARING DEVICE AND METHOD

(71) Applicant: FESTOOL GMBH, Wendlingen (DE)

(72) Inventor: Esther Holsten-Stuehmer, Hamburg (DE)

(73) Assignee: Festool GmbH, Wendlingen (DE)

( * ) Notice: Subject to any disclaimer, the term of this patent is extended or adjusted under 35 U.S.C. 154(b) by 16 days.

(21) Appl. No.: 18/683,184

(22) PCT Filed: Aug. 12, 2022

(86) PCT No.: PCT/EP2022/072714
§ 371 (c)(1),
(2) Date: Aug. 23, 2024

(87) PCT Pub. No.: WO2023/017171
PCT Pub. Date: Feb. 16, 2023

(65) Prior Publication Data
US 2025/0153342 A1    May 15, 2025

(30) Foreign Application Priority Data
Aug. 13, 2021 (DE) .................. 10 2021 208 906.2

(51) Int. Cl.
B25J 9/00        (2006.01)

(52) U.S. Cl.
CPC .......... *B25J 9/0006* (2013.01); *B25J 9/0009* (2013.01)

(58) Field of Classification Search
CPC .......... B25J 9/0009; B25J 9/0006; A45F 3/12; A45F 3/02; F41C 33/002
(Continued)

(56) References Cited

U.S. PATENT DOCUMENTS

| 6,267,280 B1 * | 7/2001 | Silagy .................. A45F 3/12 224/264 |
| 10,918,559 B2 | 2/2021 | Romo et al. |

(Continued)

FOREIGN PATENT DOCUMENTS

| DE | 690 24 498 T2 | 7/1996 |
| DE | 201 21 399 U1 | 9/2002 |

(Continued)

OTHER PUBLICATIONS

Examination Report issued in corresponding German Patent Application No. 10 2021 208 906.2, Apr. 28, 2022, 5 pages.
(Continued)

*Primary Examiner* — T. Scott Fix
(74) *Attorney, Agent, or Firm* — HSML P.C.

(57) ABSTRACT

A wearing device, which is designed as an exoskeleton and/or includes a tool, for wearing on the human body, including a shoulder strap with a shoulder strap resting section for resting on a shoulder of a user. The shoulder strap resting section has a target bending structure extending in the longitudinal direction of the shoulder strap for reducing the bending stiffness of the shoulder strap resting section in a bending direction transverse to the longitudinal direction of the shoulder strap, so that the shoulder strap resting section, in a state resting on the user's shoulder, can be bent in the bending direction by an elevation movement of the user's arm and a resulting formation of a shoulder hollow of the user, in order to assume a bent shape corresponding to the shoulder hollow and thus rest with its surface area against the user in the shoulder hollow.

20 Claims, 13 Drawing Sheets

(58) Field of Classification Search
USPC .................................................... 74/490.01
See application file for complete search history.

(56) References Cited

U.S. PATENT DOCUMENTS

2008/0314942 A1  12/2008  Tuerschmann
2017/0173783 A1   6/2017  Angold et al.

FOREIGN PATENT DOCUMENTS

| | | | |
|---|---|---|---|
| DE | 10 2018 111 349 | 2/2019 | |
| EP | 0 570 193 | 11/1993 | |
| JP | 2019-118972 | 7/2019 | |
| JP | 2020-044608 | 3/2020 | |
| WO | 91/05495 | 5/1991 | |
| WO | WO-9105495 A1 * | 5/1991 | ............. A45F 3/047 |

OTHER PUBLICATIONS

International Search Report and Written Opinion issued in International Application No. PCT/EP2022/072714, Dec. 9, 2022, 15 pages w/partial translation.

* cited by examiner

WEARING DEVICE AND METHOD

The invention relates to a wearing device, which is designed as an exoskeleton and/or comprises a tool, for wearing on the human body, comprising a shoulder strap with a shoulder strap resting section for resting on a shoulder of a user.

SUMMARY OF THE INVENTION

One object of the invention is to provide a wearing device that offers the user improved freedom of movement, for example during overhead activities.

The object is solved by a wearing device according to claim 1. The shoulder strap resting section of the wearing device has a target bending structure extending, in particular running, in the longitudinal direction of the shoulder strap for reducing the bending stiffness of the shoulder support section in a bending direction transverse to the longitudinal direction of the shoulder strap, so that the shoulder support section, in a state resting on the user's shoulder, can be bent in the bending direction by an elevation movement of the user's arm and a thus resulting formation of a shoulder hollow of the user, in order to assume a bent shape corresponding to the shoulder hollow and thus to lie in an area-contacting manner against the user in the shoulder hollow.

Due to the target bending structure, the shoulder strap resting section has a targeted weakening of the material in the direction transverse to the shoulder strap with regard to its bending stiffness, so that the shoulder strap can lie in an area-contacting manner in the region between the deltoid and trapezius when the arm, and thus inevitably the shoulder, is lifted, without uncomfortably increasing the pressure on one of the two muscles. In this way, the target bending structure—for example, targeted thinning or perforation of the textile surface of the shoulder strap resting section—enables a defined change in shape which, when used in the shoulder area of a carrying system, preferably has little or no effect on the degrees of freedom of the shoulder joint, as the shoulder strap adapts to the shoulder muscles and the change in the shoulder resting surface during movement.

Advantageous further developments are the subject of the subclaims.

The invention further relates to a method according to claim 20.

BRIEF DESCRIPTION OF THE DRAWINGS

Further exemplary details and exemplary embodiments are explained below with reference to the figures. Thereby shows FIG. 1 a schematic side view of a wearing device designed as an exoskeleton, FIG. 2 a schematic side view of an wearing device designed as an exoskeleton worn by a user, FIG. 3 a schematic detailed view of a support section of the exoskeleton, FIG. 4 a schematic rear view of the exoskeleton, FIG. 5 a schematic view of a user with a shoulder strap and a downward-facing arm, FIG. 6 a schematic view of a user with a shoulder strap and an arm pointing upwards, FIG. 7 a shoulder strap resting section with a target bending structure according to a first variant, FIG. 8 a shoulder strap resting section with a target bending structure according to a second variant, FIG. 9 a shoulder strap resting section with a target bending structure according to a third variant, FIG. 10 a shoulder strap resting section with a target bending structure according to a fourth variant, FIG. 11 a shoulder strap resting section with a target bending structure according to a fifth variant, FIG. 12 a shoulder strap resting section with a target bending structure according to a sixth variant, FIG. 13 a shoulder strap resting section with a target bending structure according to a seventh variant, and FIG. 14 a shoulder strap resting section with a target bending structure according to an eighth variant.

DETAILED DESCRIPTION OF THE INVENTION

In the following explanations, reference is made to the spatial directions x-direction, y-direction and z-direction, which are drawn in the figures and are aligned orthogonally to each other. The z-direction can also be referred to as the vertical direction, the x-direction as the depth direction and the y-direction as the width direction.

Figure 1:
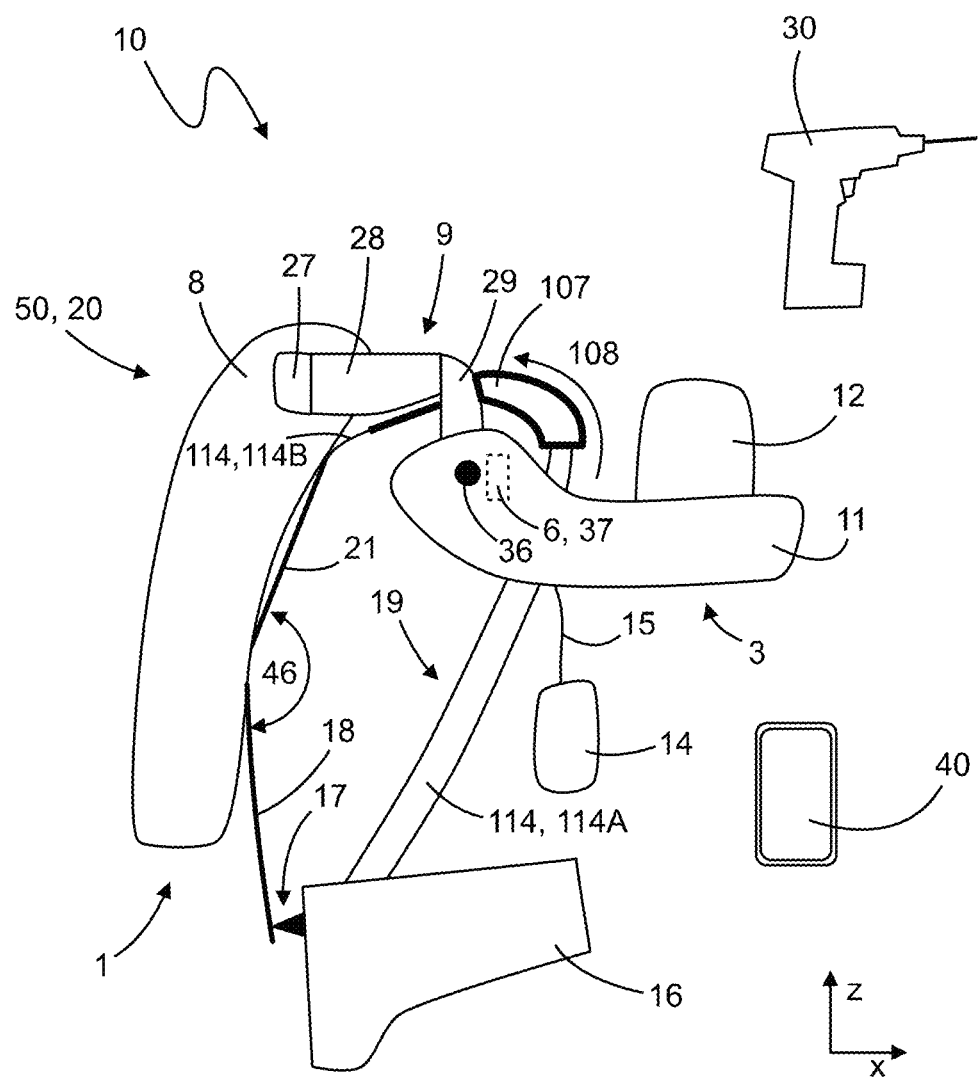

FIG. 1 shows a schematic representation of an exoskeleton device 10 comprising a wearing device 50 designed as an exoskeleton 20 and optionally a tool 30 and/or a mobile device 40. The tool 30 and/or the mobile device 40 are exemplarily provided separately from the exoskeleton 20, i.e. in particular not mechanically connected to the exoskeleton 20. The tool 30 is, for example, a power tool, in particular a cordless screwdriver and/or a drill and/or a grinder. The mobile device 40 is preferably a smartphone or a tablet. Optionally, the exoskeleton 20 is configured to communicate with the tool 30 and/or the mobile device 40, in particular wirelessly.

As an example, the exoskeleton 20 is aligned in an upright orientation with its vertical axis (which in particular runs parallel to a base section axis 62) parallel to the z-direction. In particular, the exoskeleton 20 is aligned in the upright orientation with its sagittal axis parallel to the x-direction. In a state in which the user has put on the exoskeleton 20, the sagittal axis of the exoskeleton 20 runs parallel to the sagittal axis of the user, i.e. in particular parallel to a direction from the rear—i.e. in particular the back of the user—to the front—i.e. in particular the chest of the user. The horizontal axis of the exoskeleton 20 runs in particular in the width direction of the exoskeleton 20 and/or parallel to the y-direction. In a state in which the user has put on the exoskeleton 20, the horizontal axis of the exoskeleton 20 runs parallel to the horizontal axis of the user, i.e. in particular parallel to a direction from a first shoulder of the user to a second shoulder of the user. The vertical axis of the exoskeleton 20, the sagittal axis of the exoskeleton 20 and the horizontal axis of the exoskeleton 20 are aligned orthogonally to each other.

Preferably, the wearing device 50 can be provided on its own. The wearing device 50 does not necessarily have to be designed as an exoskeleton. According to one possible embodiment, the wearing device comprises a tool and a shoulder strap. The shoulder strap is, for example, part of a carrying system that can be worn on the human body. The tool is expediently mechanically coupled to the shoulder strap, in particular in such a way that a weight force of the tool can be at least partially supported on the human body of a user via the shoulder strap and/or the carrying system. The tool is attached to the carrying system, for example. For example, the tool is a long-neck sander.

The exoskeleton device 10 and/or the wearing device 50 is designed in particular for manual and/or industrial use. Preferably, the exoskeleton device 10 and/or the wearing device is not designed for medical and/or therapeutic use.

The exoskeleton 20 is an active exoskeleton and in particular has an internal energy source from which the energy for the support force is provided. In particular, the exoskeleton 20 is an active exoskeleton for actively supporting the user's shoulder joint.

The exoskeleton 20 comprises a base section 1 for attachment to a body section of a human body of a user. By way of example, the base section 1 serves to be attached to the torso 2 of the human body.

The base section 1 comprises a main section and a textile carrying system, which is in particular detachably attached to the main section. By way of example, the main section serves to be worn on the back of the human body by means of the textile carrying system, in particular in a backpack-like manner. The main section comprises a back part 8, which is in particular elongated and which is expediently aligned with its longitudinal axis vertically and/or in the longitudinal direction of the user's back. For example, the longitudinal direction of the back part 8 extends along the longitudinal direction of the back. The main section further comprises a force transmission element 18, which is in particular strip-shaped and/or rigid and extends downwards from the back part 8 to a pelvic strap 16 in order to mechanically couple the back part 8 to the pelvic strap 16. The force transmission element 18 is expediently used to transmit a reaction force, which is transmitted from a support section 3 to the back part 8, further to the pelvic strap 16. As an example, the back part 8 is tubular and/or backpack-shaped. The back part 8 is in particular rigid. In particular, the back part 8 comprises an expediently rigid back part housing, which is made, for example, from an in particular rigid plastic and/or as a hard shell. The back part 8 expediently serves to transmit a force from the support section 3 to the force transmission element 18 and/or to accommodate components for controlling the support force.

The support section 3 can expediently be referred to as an arm actuator.

The force transmission element 18 is exemplarily sword-shaped and can also be referred to as a sword. Expediently, the force transmission element 18 is designed to be adjustable relative to the back part 8, in particular in order to change the vertical extent of the main section and/or a force transmission element angle 46 between the force transmission element 18 and the back part 8 facing the user's back. Expediently, the force transmission element 18 is mounted for translational and/or rotational movement relative to the back part 8 and, in particular, can be moved into various translational and/or rotational positions relative to the back part 8 and, in particular, can be locked. The translational movement is in particular vertical. The rotational movement is expediently performed about an adjustment axis aligned parallel to the y-direction.

The textile carrying system comprises, by way of example, the pelvic strap 16 and/or at least one, preferably two, shoulder straps 19. The pelvic strap 16 expediently forms a loop so that, when worn, it surrounds the torso 2, in particular the hips, of the user. Each shoulder strap 19 extends exemplarily from the main section, in particular from the back part 8, to the pelvic strap 16, expediently over a respective shoulder of the user when the exoskeleton 20 is worn.

The exoskeleton 20 further comprises, by way of example, a force transmission element joint 17, via which the force transmission element 18 is attached to the pelvic strap 16. The force transmission element joint 17 is designed, for example, as a ball joint and can be referred to as a sacral joint. When the exoskeleton 20 is worn, the force transmission element joint 17 is arranged in the lower back region of the user, in particular centered in the width direction.

By way of example, the textile carrying system also comprises a back net 21, which is arranged on the side of the back part 8 facing the user's back. When the exoskeleton 20 is worn, the back net 21 lies against the user's back, in particular at least partially and/or in the upper back region.

The exoskeleton 20 further comprises the support section 3 movably coupled to the base section 1 for supporting a limb, in particular an arm 4, of the human body of the user. In particular, the support section 3 is designed to be attached to the limb, in particular the arm 4, of the user. The support section 3 comprises, by way of example, an in particular rigid arm part 11 and an arm attachment 12 arranged on the arm part 11, which is designed, by way of example, as an arm shell. The arm part 11 is exemplarily elongated and, when worn, is aligned with its longitudinal axis in the direction of the longitudinal axis of the user's arm. As an example, the arm part 11 extends from the shoulder of the user to the elbow area of the user. The exoskeleton 20, in particular the arm part 11, ends at the elbow area of the user. The arm attachment 12 is used in particular to attach the support section 3 to the arm 4, in particular the upper arm, of the user. In particular, the arm shell surrounds the upper arm of the user, in particular at least partially, so that the upper arm can be held in the arm shell with a strap. The user's forearm is expediently not attached to the exoskeleton 20.

As an example, the support section 3 is mounted so that it can pivot about a horizontal pivot axis relative to the base section 1, in particular relative to the back part 8. As an example, the support section 3 is mounted directly on a shoulder part 29. The horizontal pivot axis can also be referred to as the lifting axis 36. When the exoskeleton 20 is worn, the lifting axis 36 is located in the area of the user's shoulder. In particular, the exoskeleton 20 is designed to support the user's shoulder joint with the support section 3. When the exoskeleton 20 is worn, the user can perform a lifting movement with his arm 4 supported by the support section 3 by pivoting the support section 3 about the lifting axis 36. In particular, the lifting axis 36 can be aligned in the y-direction. Expediently, the lifting axis 36 always lies in a horizontal plane, for example an x-y plane. In particular, a horizontal plane is to be understood as an exactly horizontal plane and/or a plane that is tilted by a maximum of 10 degrees, 7 degrees or 5 degrees relative to a horizon.

The pivot angle 47 of the support section 3 about the lifting axis 36 relative to the base section 1 should also be referred to as the lifting angle. The pivot angle 47 has a reference value, in particular a minimum value, when the support section 3 is oriented downwards (in the case of a vertically oriented exoskeleton 20) and increases continuously up to a maximum value when the support section 3 is pivoted upwards. The minimum value is in particular a minimum value in terms of amount, for example zero.

As an example, the pivot angle 47 is defined as an angle between a support section axis 61 and a base section axis 62. The support section axis 61 extends in the longitudinal direction of the support section 3. Exemplarily, the support section axis 61 extends from the lifting axis 36 in the direction of the arm attachment 12. In a state in which the user has put on the exoskeleton 20, the support section axis 61 expediently extends parallel to an upper arm axis of the arm 4 supported by the support section 3. The base section axis 62 expediently represents a vertical axis of the base section 1 and extends vertically downwards, in particular in a vertical orientation of the base section 1, for example in a state in which the user has put on the exoskeleton 20 and is standing upright. As an example, the pivot angle 47 lies in a z-x plane, for example when the user is standing upright and the arms are lifted forwards.

The exoskeleton 20 comprises, by way of example, a shoulder joint arrangement 9, via which the support section 3 is attached to the base section 1, in particular the back part 8. The shoulder joint arrangement 9 expediently comprises a joint chain with one or more pivot bearings for defining one or more vertical axes of rotation. By means of the joint chain, it is expediently possible to pivot the support section 3 relative to the base section 1, in particular relative to the back part 8, in a preferably horizontal pivot plane, for example about a virtual vertical axis of rotation. In particular, the joint chain enables the user to pivot his arm 4, which is supported by the support section 3, about a vertical axis of rotation running through the user's shoulder, whereby the support section 3 is moved along with the arm 4. As an example, the joint chain is designed to be passive, so that the exoskeleton 20 does not provide any active support force in the direction of the horizontal pivot movement when the arm is pivoted in the preferably horizontal pivot plane.

The shoulder joint arrangement 9 is expediently arranged and/or designed in such a way that it defines a free space which, when the exoskeleton 20 is worn, is located above the shoulder of the user wearing the exoskeleton 20, so that the user can align his arm, which is supported by the support section 3, vertically upwards through the free space past the shoulder joint arrangement 9.

By way of example, the shoulder joint arrangement 9 comprises an inner shoulder joint section 27, which is mounted so as to be pivotable about a first vertical axis of rotation relative to the base section 1, in particular to the back part 8, by means of a first pivot bearing of the shoulder joint arrangement 9. By way of example, the shoulder joint arrangement 9 further comprises an outer shoulder joint section 28, which is mounted so as to be pivotable about a second vertical axis of rotation relative to the inner shoulder joint section 27 by means of a second pivot bearing of the shoulder joint arrangement 9. By way of example, the shoulder joint arrangement 9 further comprises a shoulder part 29 which is mounted so as to be pivotable about a third vertical axis of rotation relative to the outer shoulder joint section 28 by means of a third pivot bearing of the shoulder joint arrangement 9. Preferably, the inner shoulder joint section 27, the outer shoulder joint section 28 and the shoulder part 29 in the shoulder joint arrangement 9 are kinematically coupled to one another as the joint chain in such a way that the pivot angle of the inner shoulder joint section 27 relative to the base section 1 determines the pivot angle of the outer shoulder joint section 28 relative to the inner shoulder joint section 27 and/or the pivot angle of the shoulder part 29 relative to the outer shoulder joint section 28.

Figure 3:
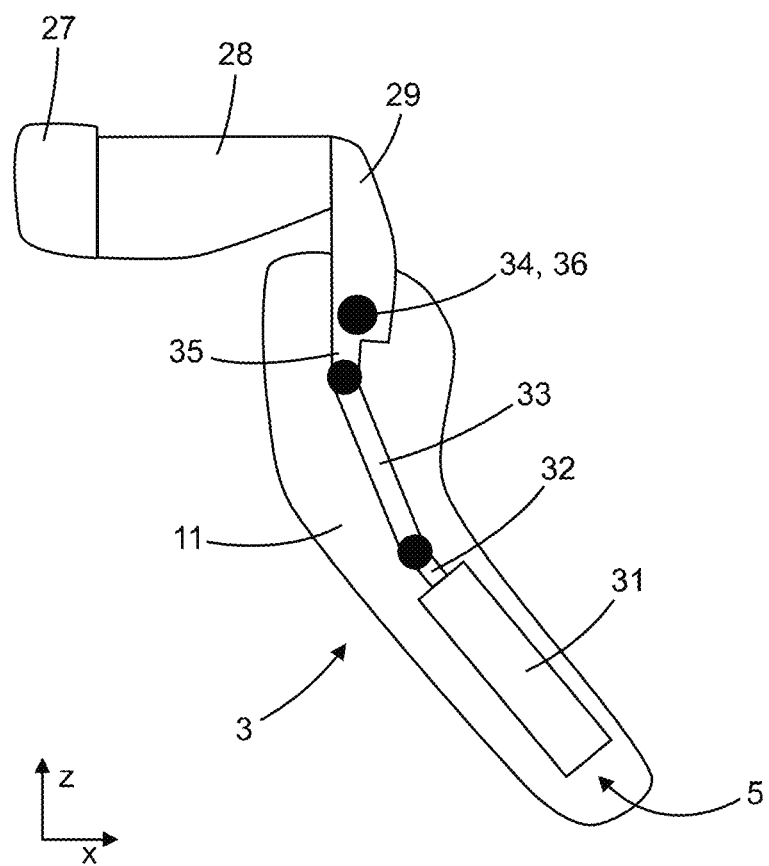

FIG. 3 shows a schematic detailed view of the support section 3, with components arranged within the arm part visibly shown. The arm part 11 expediently comprises an arm part housing, which is in particular rigid and made of plastic, for example.

The exoskeleton 20 comprises an actuator device 5 acting on the support section 3 to provide a support force for the limb, exemplarily for the user's arm. By way of example, the actuator device 5 is arranged at least partially in the arm part 11.

The actuator device 5 is an active actuator device. Expediently, the exoskeleton 20 provides the support force by means of the actuator device 5 with a force component acting upwards in the direction of the pivoting movement about the lifting axis 36, which pushes the user's arm 4 upwards in the direction of the pivoting movement.

Preferably, the actuator device 5 comprises an actuator unit with an actuator member 32. The actuator unit can apply an actuator force to the actuator member 32 in order to provide the support force. The actuator member 32 is coupled to an eccentric section 35 arranged eccentrically to the lifting axis 36. The eccentric section 35 is part of the shoulder part 29, for example. By coupling the actuator member 32 to the eccentric section 35, the actuator force provides a torque of the support section 3 about the lifting axis 36 relative to the base section 1 and/or the shoulder part 29. Due to this torque, the support section 3 presses against the limb, in particular the arm 4, of the user, in particular upwards, and thus provides the support force acting on the limb, in particular the arm 4, of the user.

As an example, the actuator device 5 has a coupling element 33, in particular designed as a push rod, via which the actuator member 32 is coupled to the eccentric section 35.

Preferably, the actuator device 5 is a pneumatic actuator device and the actuator unit is expediently designed as a pneumatic drive cylinder 31. The actuator member 32 is the piston rod of the drive cylinder 31.

Alternatively, the actuator device may not be designed as a pneumatic actuator device. For example, the actuator device can be designed as a hydraulic and/or electric actuator device and, expediently, comprise a hydraulic drive unit and/or an electric drive unit as the actuator unit.

The drive cylinder 31, the actuator member 32 and/or the coupling element 33 are preferably arranged in the arm part housing.

The exoskeleton 20 expediently comprises a lifting pivot bearing 34, which provides the lifting axis 36. As an example, the support section 3 is attached to the shoulder joint arrangement 9 via the lifting pivot bearing 34.

Figure 4:
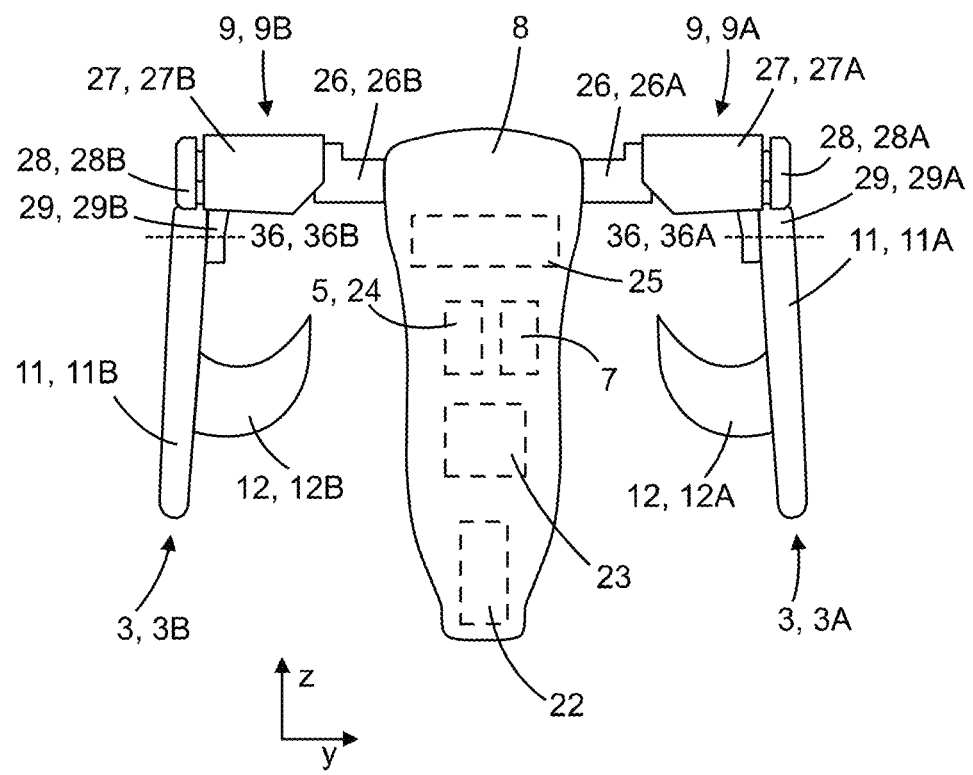

FIG. 4 shows a rear view of the exoskeleton 20, whereby the textile support system and the force transmission element 18 are not shown.

The exoskeleton 20 comprises, by way of example, one or more batteries 22, a compressor 23, a valve unit 24 and/or a compressed air tank 25, which are expediently part of the base section 1 and are arranged in particular in the back part housing.

By way of example, the rechargeable battery 22 is arranged at the bottom of the back part 8 and, in particular, is inserted into a rechargeable battery holder of the back part 8 from below. Expediently, the compressed air tank 25 is arranged in an upper region in the back part 8, exemplarily (in particular in the longitudinal direction of the back part 8 and/or vertical direction) above the valve unit 24, the control device 7, the compressor 23 and/or the rechargeable battery 22. The valve unit 24 and/or the control device 7 is (in particular in the longitudinal direction of the back part 8 and/or vertical direction) expediently arranged above the compressor and/or above the rechargeable battery 22. The compressor 23 is arranged (in particular in the longitudinal direction of the back part 8 and/or vertical direction) above the battery 22.

The battery 22 serves as an electrical power supply for the exoskeleton 20, in particular for the compressor 23, the valve unit 24, a sensor device 6 and/or a control device 7.

The compressor 23 is designed to compress air in order to generate compressed air. The compressed air tank 25 is designed to store compressed air—in particular the compressed air generated by the compressor 23.

The valve unit 24 expediently comprises one or more electrically operable valves and is designed in particular to influence a pneumatic connection from the compressed air tank 25 to a pressure chamber of the pneumatic drive cylinder 31, in particular to selectively establish and/or block the pneumatic connection. Expediently, the valve unit 24 is further designed to influence a pneumatic connection from the compressed air tank 25 to the environment of the exoskeleton 20 and/or a pneumatic connection from the pressure chamber of the drive cylinder 31 to the environment of the exoskeleton 20, in particular to selectively establish and/or block the pneumatic connection. The valve unit 24 is expediently part of the actuator device 5.

The exoskeleton 20 further comprises a sensor device 6. As an example, the sensor device 6 comprises an angle sensor 37 for detecting the angle of the support section 3 relative to the base section 1, in particular the arm part 11 relative to the shoulder part 29. This angle should also be referred to as the pivot angle 47 or the lifting angle. The angle sensor 37 is used in particular to detect the angle of the support section 3 about the lifting axis 36. The angle sensor 37 is designed, for example, as an incremental encoder and is arranged in particular on the lifting pivot bearing 34, in particular in the arm part 11 and/or in the shoulder part 29.

Preferably, the sensor device 6 further comprises at least one pressure sensor for detecting the pressure prevailing in the pressure chamber of the drive cylinder 31 and/or the pressure prevailing in the compressed air tank 25. The at least one pressure sensor is expediently arranged in the back part 8 and/or in the arm part 11.

The exoskeleton device 10, in particular the exoskeleton 20, expediently comprises a control device 7, which for example comprises a microcontroller or is designed as a microcontroller. The control device 7 is used in particular to control the actuator device 5, in particular the valve unit 24, in order to control the provision of the support force.

Furthermore, the control device 7 is used to read out the sensor device 6, in particular to read out data recorded by the sensor device 6 and/or to communicate with the tool 30 and/or the mobile device 40. Preferably, the control device 7 is designed to adjust the pressure prevailing in the pressure chamber of the drive cylinder 31 by actuating the valve unit 24, in particular to closed-loop control the pressure, for example taking into account a pressure value recorded by means of the pressure sensor. In particular, the control device 7 is designed to increase the pressure prevailing in the pressure chamber by actuating the valve unit 24 in order to increase the support force and/or to reduce the pressure prevailing in the pressure chamber by actuating the valve unit 24 in order to reduce the support force.

According to a preferred embodiment, the control device 7 is designed to adjust the support force on the basis of the pivot angle 47 of the support section 3 detected in particular by means of the angle sensor 37. Expediently, the user can use his muscle strength to change the pivot angle 47 of the support section 3 by pivoting his arm 4, thereby influencing in particular the provision of the support force. In particular, the support force is low enough so that the user can change the pivot angle 47 of the support section 3 by pivoting his arm 4 using his muscle strength. The support force is limited, for example, by the design of the pneumatic system, in particular the compressor, and/or by the control device 7.

The control device 7 is preferably part of the exoskeleton 20 and is exemplarily arranged in the base section 1, in particular in the back part 8. Optionally, the control device 7 can be at least partially implemented in the mobile device 40.

As an example, the exoskeleton 20 comprises an operating element 14, which is expediently attached to the base section 1 via an operating element cable 15. The user can control the exoskeleton 20 via the operating element 14 and, in particular, activate, deactivate and/or set the support force to one of several possible force values greater than zero.

As an example, the exoskeleton 20 further has a connecting element 26, via which the shoulder joint arrangement 9 is attached to the base section 1, in particular the back part 8. The connecting element 26 is exemplarily designed as a pull-out element. The connecting element 26 is expediently adjustable in its position relative to the base section 1, in particular relative to the back part 8, in order to be able to adapt the position of the shoulder joint arrangement 9 and the support section 3 to the shoulder width of the user. In particular, the position of the connecting element 26 can be adjusted by pushing or pulling the connecting element 26 in or out of the back part 8.

By way of example, the exoskeleton 20 has a first support section 3A, a first shoulder joint arrangement 9A and a first connecting element 26A, as well as a second support section 3B, a second shoulder joint arrangement 9B and a second connecting element 26B. The components whose reference signs are provided with the suffix "A" or "B" are expediently each designed in correspondence with the components provided with the same reference sign number but without the suffix "A" or "B", for example identical or mirror-symmetrical, so that the explanations in this regard apply in correspondence.

The first support section 3A, the first shoulder joint arrangement 9A and the first connecting element 26A are arranged on a first, exemplarily the right, side (in width direction) of the base section 1, and serve to support a first, in particular the right, arm of the user.

The second support section 3B, the second shoulder joint arrangement 9B and the second connecting element 26B are arranged on a second, exemplarily the left, side (in width direction) of the base section 1 and serve to support a second, in particular the left, arm of the user.

The first support section 3A comprises a first arm part 11A, a first arm attachment 12A and/or a first actuator unit, in particular a first drive cylinder.

The second support section 3A comprises a second arm part 11B, a second arm attachment 12B and/or a second actuator unit, in particular a second drive cylinder.

Preferably, the control device 7 is designed to set a first support force for the first support section 3A by means of the first actuator unit and to set a second support force for the second support section 3B by means of the second actuator unit, which second support force is expediently different from the first support force.

The first shoulder joint arrangement 9A comprises a first inner shoulder joint section 27A, a first outer shoulder joint section 28A and a first shoulder part 29A. The second shoulder joint arrangement 9B comprises a second inner shoulder joint section 27B, a second outer shoulder joint section 28B and a second shoulder part 29B.

The first support section 3A is pivotable about a first horizontal lifting axis 36A relative to the base section 1 and the second support section 3B is pivotable about a second horizontal lifting axis 36B relative to the base section 1.

Figure 2:
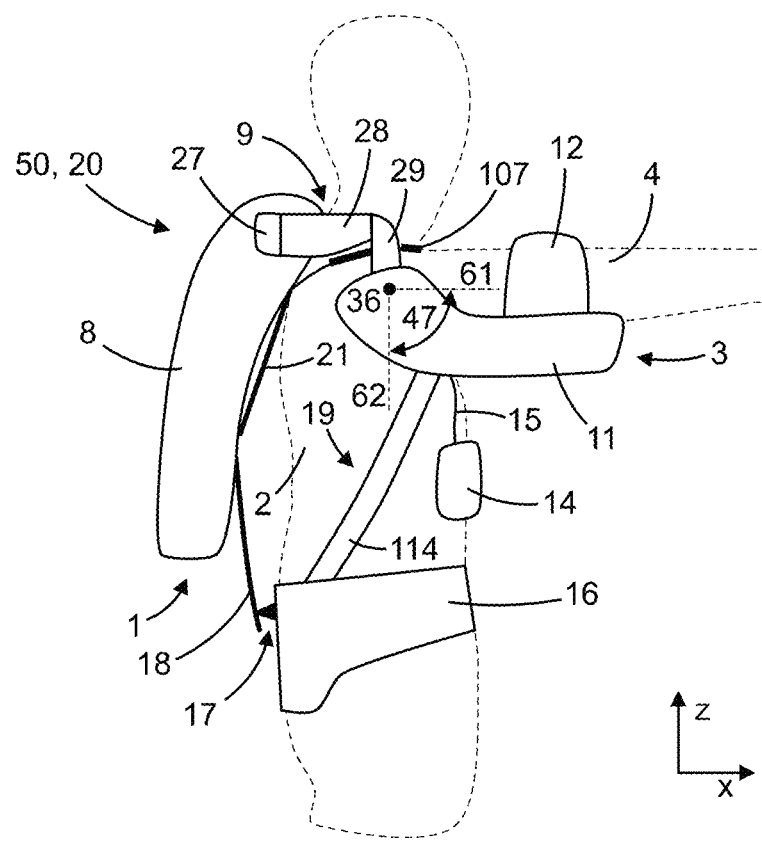

In FIG. 2, the exoskeleton 20 is shown in a state in which it is worn by a user, in particular worn as intended. By the formulation that the user is wearing the exoskeleton 20, in particular wearing it as intended, it is meant that the user has put on the exoskeleton, i.e. put it on, by way of example in that the user is wearing the back part 8 on his back like a backpack, has put on the pelvic strap 16 around his hips, the shoulder strap or shoulder straps 19 run over the shoulder or shoulders of the user and/or one or both arms of the user are attached to the respective support section 3 with a respective arm attachment 12.

By way of example, the exoskeleton 20 is designed to support the user during a lifting movement of a respective arm, i.e. during an upwardly directed pivoting of the respective support section 3 about a respective lifting axis 36, with a respective support force acting in particular upwards. Furthermore, the exoskeleton 20 is expediently designed to support or counteract the user during a lowering movement, i.e. during a downward pivoting of the respective support section 3 about a respective lifting axis 36, with a respective support force acting in particular upwards, or to deactivate or reduce the respective support force during the lowering movement.

The wearing device 50, which is designed as an exoskeleton 20 and/or comprises a tool, is used for wearing on the human body of a user.

The wearing device 50 comprises the shoulder strap 19, which comprises a shoulder strap resting section 107 for resting on a shoulder of the user.

The longitudinal direction of the shoulder strap 19 shall be referred to as the shoulder strap longitudinal direction 108. Preferably, the shoulder strap longitudinal direction 108 runs along the shoulder strap 19 from the front, in particular the chest, of the user to the rear, in particular the back, of the user. In particular, the shoulder strap longitudinal direction 108 runs along the shoulder strap 19 from a first fastening point of the shoulder strap 19 (located in particular on the pelvic strap 16) to a second fastening point of the shoulder strap 19 (located in particular on the back net 21). The first fastening point is in particular a lower fastening point and the second fastening point is in particular an upper fastening point.

In an exemplary embodiment, the shoulder strap 19 further comprises at least one strap section 114. The strap section 114 is expediently located in front of or behind the shoulder strap resting section 107 in the longitudinal direction 108 of the shoulder strap. For example, the strap section 114 comprises a front strap section 114A, which is located in front of the shoulder strap resting section 107 in the longitudinal direction 108 of the shoulder strap and/or optionally a rear strap section 114B, which is located behind the shoulder strap resting section 107 in the longitudinal direction 108 of the shoulder strap.

By way of example, the shoulder strap resting section 107, in particular the entire shoulder strap resting section 107, is padded and/or the strap section 114, in particular the front strap section 114A and/or the rear strap section 114B, is not padded. For example, the shoulder strap resting section 107 is designed as a support pad, in particular as a flat support pad. Expediently, the shoulder strap resting section 107 has a thickness of 5 mm to 7 mm or greater than or equal to 7 mm.

The shoulder strap resting section 107 is in particular elongated in shape and expediently runs with its longitudinal extension in the longitudinal direction 108 of the shoulder strap. For example, the shoulder strap resting section 107 (in particular unwound and/or planar) can have a rectangular outline, in particular in plan view.

The shoulder strap resting section 107 has a resting section lower side which, in a state in which the user wears the wearing device 50 and the shoulder strap resting section 107 rests on the shoulder of the user, contacts the user in particular in an area-contacting manner. The shoulder strap resting section 107 furthermore has a support section upper side, which is arranged in particular opposite to the support section lower side and, expediently, in a state in which the user wears the wearing device 50 and the shoulder strap resting section 107 rests on the user's shoulder, faces away from the user's shoulder and, in particular, is oriented upwards and/or forwards. The upper side of the support section and the lower side of the support section are expediently the largest sides of the shoulder strap resting section 107 in terms of surface area.

By way of example, the width (in particular extending in the y-direction and/or horizontal) of the shoulder strap resting section 107 is greater than the width of the strap section 104. Preferably, the thickness of the shoulder strap resting section 107 is greater than the thickness of the strap section 104. The term thickness is intended to mean the extension orthogonal to the longitudinal direction 108 of the shoulder strap and orthogonal to the width. The width of the shoulder strap resting section 107 is a multiple of its thickness. The length of the shoulder strap resting section 107 is a multiple of its width and/or thickness.

Figure 5:
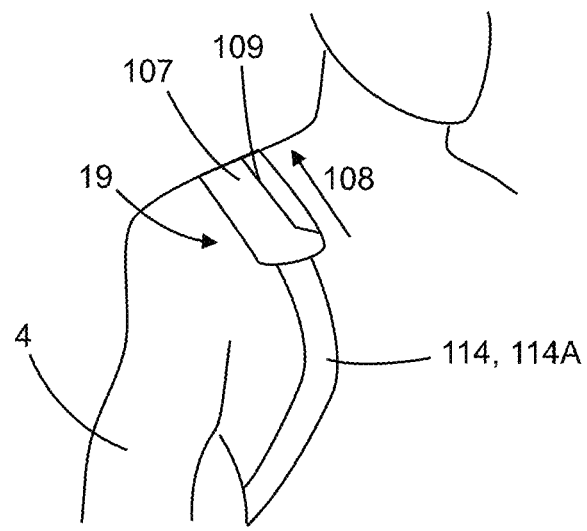
Figure 6:
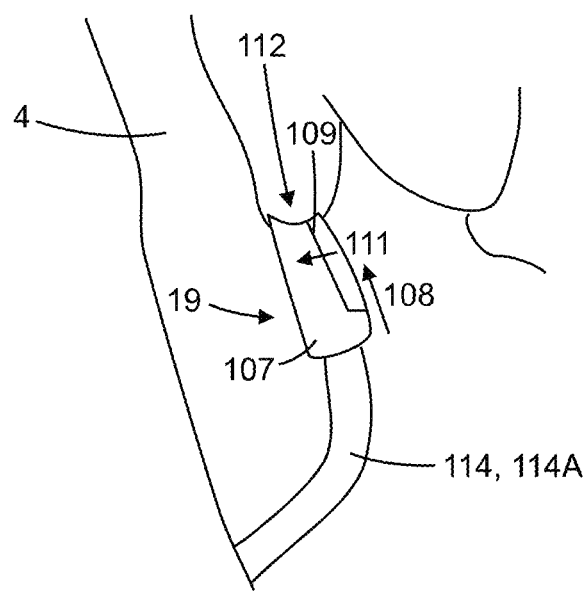

FIGS. 5 and 6 show a user with a shoulder strap 19. The other components of the wearing device 50 are not shown in FIGS. 5 and 6 for the sake of clarity. In FIG. 5, the user's arm 4 is pointing downwards. In FIG. 6, the user has performed an elevation movement with his arm so that the arm 4 is oriented upwards. The elevation movement can also be described as a lifting movement.

The shoulder strap 19 runs from the user's chest, in particular starting from the user's hip, in the longitudinal direction of the shoulder strap 108 over the user's shoulder backwards to the user's back. FIGS. 5 and 6 show the right shoulder strap (from the user's perspective) resting on the right shoulder. Preferably, the wearing device 50 further comprises a left shoulder strap, which is designed in particular to correspond to the right shoulder strap 19, for example mirror-symmetrically to the right shoulder strap 19, and which rests on the left shoulder.

The shoulder strap resting section 107 has a target bending structure 109 which extends, in particular runs, in the longitudinal direction 108 of the shoulder strap. The target bending structure 109 serves to reduce the bending stiffness of the shoulder strap resting section 107 in a bending direction 111 transverse to the shoulder strap longitudinal direction 108 of the shoulder strap 19. For example, the target bending structure 109 reduces the bending stiffness in that the thickness of the shoulder strap resting section 107 is reduced along the target bending structure 109, in particular relative to the remaining shoulder strap resting section 107.

Preferably, the target bending structure 109 comprises one or more target bending lines. Each target bending line is a line about which the shoulder strap resting section 107 can be bent more easily (than about a location of the shoulder strap resting section 107 where there is no target bending line). Each target bending line may also be referred to as a linear target bending course or a linear target bending location. Each target bending line can take the form of a solid line or a dashed line—i.e. in particular an interrupted line. In particular, each target bending line reduces the bending stiffness in that the thickness of the shoulder strap resting section 107 is reduced along the target bending line, in particular relative to the remaining shoulder strap resting section 107.

Preferably, the target bending structure 109 comprises thinning, perforations, seams and/or plastic deformations to reduce the bending stiffness. For example, each target bending line (in particular mentioned above and/or below) is formed by a thinning, perforation, seam and/or plastic deformation. For example, each target bending line may be made by linear perforation, linear embossing, compression, welding or stitching.

Preferably, the shoulder strap resting section 107 is made of the same material (or materials) on both sides of one, more or all of the target bending lines of the target bending structure 109.

The target bending structure 109, in particular each target bending line, runs in particular in the plane of the lower side of the resting section and/or the upper side of the resting section.

Optionally, the shoulder strap comprises piping running in the longitudinal direction and at least one target bending section arranged between the piping, which has a reduced bending stiffness compared to the piping and forms at least part of the target bending structure 109. Optionally, each target bending line can be formed by a target bending section arranged between piping. Each piping is, for example, a reinforcement with a particularly round profile inserted into a textile, for example a cord or a plastic rod or metal rod.

The bending direction 111 runs in particular in a horizontal direction, for example in the y-direction. The bending direction 111 corresponds, for example, to the width direction of the shoulder strap resting section 107. A bend or bending stiffness in the bending direction 111 means, in particular, a bend or bending stiffness about a bending axis (actual or imaginary) running in the longitudinal direction 108 of the shoulder strap. The bending axis is formed, for example, by a target bending line.

Preferably, by reducing the bending stiffness in the bending direction 111, the shoulder strap resting section 107 can be bent in the bending direction 111 in a state resting on the user's shoulder by the elevation movement of the user's arm 4 and a thus resulting formation of a shoulder hollow 112 of the user, in order to preferably assume a bent shape corresponding to the shoulder hollow 112 and thus rest in the shoulder hollow 112 against the user in particular in an area-contacting manner.

During the elevation movement, i.e. an upward lifting movement of the arm 4, in particular vertically upward and/or higher than 90 degrees relative to a vertical axis, for example starting from a downward orientation of the arm 4, a hollow is formed between the neck and the arm 4, in particular between the neck and the shoulder joint, of the user, which shall be referred to as the shoulder hollow 112 of the user. The shoulder hollow 112 is located in particular between the deltoid muscle ("deltoid") and the trapezius muscle ("trapezius") of the user. The shoulder hollow 112 is in particular U-shaped or V-shaped and/or concave upwards. With increasing elevation of the arm 4 during the elevation movement, the shoulder hollow becomes increasingly narrower, in particular in the y-direction, so that the shoulder strap resting section 107 is pressed against the neck and/or trapezius muscle of the user by the shoulder joint and/or deltoid muscle of the user. Without the target bending structure 109, the shoulder strap resting section 107 would not assume a bent shape corresponding to the shoulder hollow 112 and would hinder the user during the elevation movement. Due to the target bending structure 109, the shoulder strap resting section 107 is brought into the bent shape during the elevation movement by the shoulder hollow 112, which becomes narrower, which bent shape corresponds to the shape, in particular the U-shape or V-shape and/or upwardly concave shape of the shoulder hollow. The U-shape or V-shape is given in particular in a y-z section. In the bent shape, the underside of the resting section is expediently in contact with the user, in particular in a surface-contacting manner, and has a downwardly convex shape, for example.

For example, at least two resting section segments are defined by the target bending structure 109, which resting section segments are separated from one another in particular by one or more target bending lines. At least one resting section segment can be folded up relative to another resting section segment in order to provide the bent shape of the shoulder strap resting section 107. The target bending structure 109, in particular each target bending line, expediently functions as a solid hinge between the resting section segments. The resting section segments are in particular surface segments of the resting section upper side and/or resting section lower side.

With reference to FIGS. 7 to 14, various possible variants of the target bending structure 109 will be discussed below. In FIGS. 7 to 14, the shoulder strap resting section 107 is shown in a top view in each case. Each shoulder strap resting section 107 shown comprises that longitudinal region (in the longitudinal direction 108 of the shoulder strap) which rests on the top of the user's shoulder and/or lies in the shoulder hollow 112 when the arm 4 is stretched vertically upwards. In particular, this longitudinal region is located centrally in the longitudinal direction 108 of the shoulder strap for each shoulder strap resting section 107 shown. The shoulder strap resting section 107 can be longer overall than the longitudinal region shown in each case. FIGS. 7 to 15 show, in particular, a right shoulder strap resting section 107 (from the user's perspective) for the right shoulder (from the user's perspective). The right side (from the perspective of the viewer of the drawing) of the shoulder strap resting section 107 shown in each case faces the neck of the user and the left side (from the perspective of the viewer of the drawing) of the shoulder strap resting section 107 shown in each case faces the shoulder joint of the user.

As an example, each shoulder strap resting section 107 has a first lateral edge region 117 and/or a second lateral edge region 118. The first lateral edge region 117 and/or the second lateral edge region 118 extends in the longitudinal direction 108 of the shoulder strap and delimits the shoulder strap resting section 107 in the width direction. As an example, the first lateral edge region 117 faces the user's neck and/or the second lateral edge region 118 faces the user's shoulder joint.

As an example, each shoulder strap resting section 107 has a front edge region 119 and/or a rear edge region 121. The front edge region 119 and/or the rear edge region 121 extends in the width direction of the shoulder strap 19. The rear edge region 121 delimits the shoulder strap resting section 107 rearwardly in the longitudinal direction 108 of the shoulder strap. The front edge region delimits the shoulder strap resting section 107 towards the front in the opposite direction to the longitudinal direction 108 of the shoulder strap.

The first lateral edge region 117 comprises a first lateral edge, the second lateral edge region 118 comprises a second lateral edge, the front edge region 119 comprises a front edge and/or the rear edge region 121 comprises a rear edge.

Reference is made below to an imaginary shoulder strap center line 116, which runs in the longitudinal direction 108 of the shoulder strap and is arranged centrally with respect to the width of the shoulder strap resting section 107.

An advantageous variant provides for the shoulder strap resting section 107 to have a soft material, for example a foam. Advantageously, there is only one target bending line, in particular only a local thinning, e.g. in the form of a stitched seam or a plastic deformation. A folding point defined by the target bending line preferably has a maximum distance of ⅓ of the width of the shoulder strap resting section 107 from the first lateral edge and preferably extends from the first lateral edge of the shoulder strap over a width of ⅓ of the shoulder strap resting section 107 in the direction of the center of the shoulder strap resting section 107.

It is particularly advantageous if the target bending line, which is designed in particular as a thinning, does not extend over the entire length of the shoulder strap resting section 107 and/or is arranged in a V-shape, arc or crescent shape over the shoulder strap resting section 107, so that the target bending line, which is designed in particular as a thinning, expediently runs out on the first lateral edge both on the front side (breast side) and on the rear side (back side). This ensures a comfortable fit. In addition, an automatic folding back from a V-shape that hugs the muscles into a flat or relatively flat shape can be achieved when the arm 4 is lowered again. In particular, unintentional folding together, i.e. resting section segments lying on top of each other, can be prevented.

Figure 7:
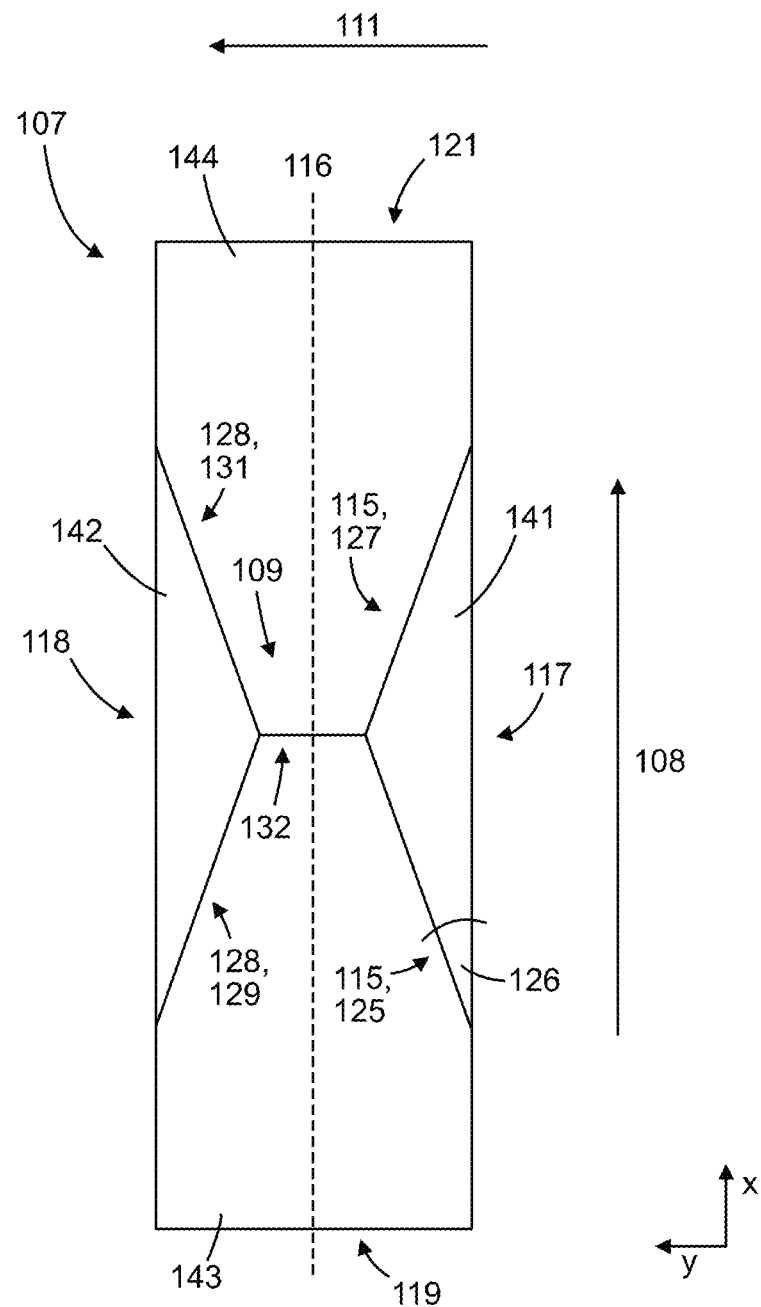
Figure 8:
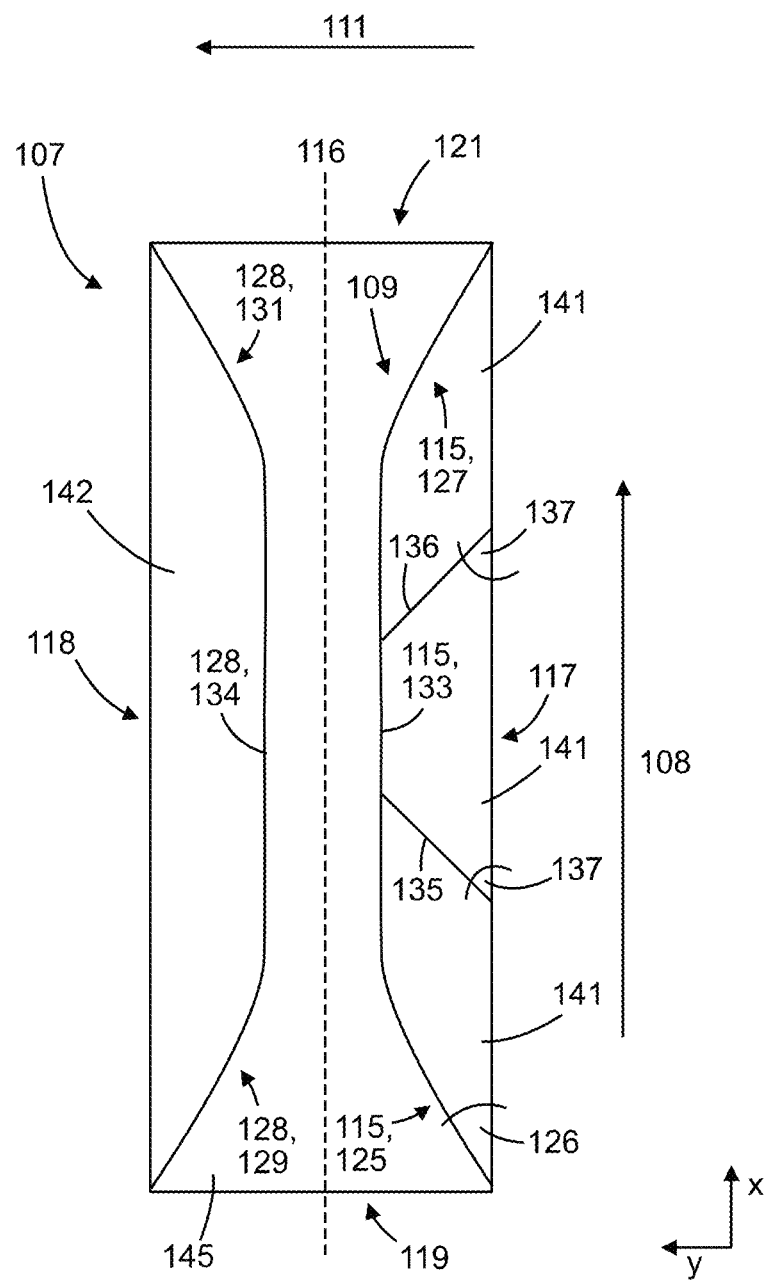
Figure 9:
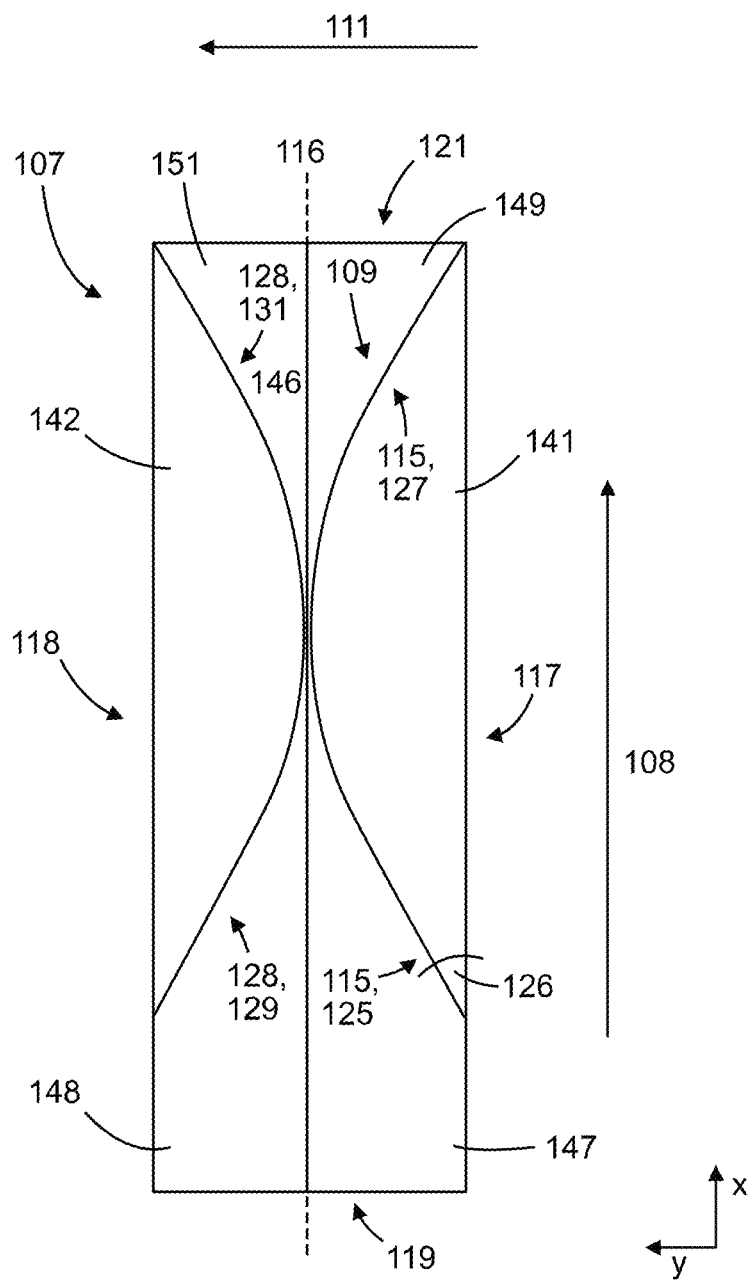

The variants of the target bending structure 109 shown in FIGS. 7, 8, 9 will be discussed below, beginning with a discussion of features that may be present in each of these variants.

Preferably, the target bending structure 109 comprises at least a first one-sided target bending line 115. In particular, a one-sided target bending line is to be designated as a target bending line which runs in the width direction (i.e. in the y-direction) only on one side—for example the side facing the neck—of the shoulder strap resting section 107, in particular the upper side of the support section. In particular, a one-sided target bending line 115 is to be designated as a target bending line which does not extend to an opposite lateral edge region of the shoulder strap resting section 107 and/or does not cross the shoulder strap center line 116.

Preferably, the first one-sided target bending line 115 has a first front target bending line longitudinal section 125 which, starting from the first lateral edge region 117, in particular the first lateral edge, of the shoulder strap resting section 107, extends in the direction towards the imaginary shoulder strap center line 116 which is located centrally on the shoulder strap resting section 107 in the bending direction 111 and extends in the shoulder strap longitudinal direction 108. The first front target bending line longitudinal section 125 extends diagonally, in particular in an x-y direction. In an exemplary embodiment, the first front target bending line longitudinal section 125 extends at an acute angle 126, in particular of at most 45 degrees, in an exemplary embodiment of 20 degrees or of 30 degrees, starting from the first lateral edge region 117 diagonally to the rear in the shoulder strap longitudinal direction 108 and towards the imaginary center line 116.

Preferably, the first one-sided target bending line 115 has a first rear target bending line longitudinal section 127 arranged behind the first front target bending line longitudinal section 125 in the shoulder strap longitudinal direction 108, which extends in the direction towards the first lateral edge region 117, in particular towards the first lateral edge. The first rear target bending line longitudinal section 127 extends diagonally (or at least diagonally in sections), in particular in an x-y direction (in the opposite y direction as the first front target bending line longitudinal section 125). In an exemplary embodiment, the first rear target bending line longitudinal section 127 extends at an acute angle (in particular with respect to a transition to the first lateral edge), in particular of at most 45 degrees, in an exemplary embodiment of 20 degrees or of 30 degrees, towards the first lateral edge region 117, in particular the first lateral edge, in particular diagonally towards the rear in the shoulder strap longitudinal direction 108.

Preferably, the first one-sided target bending line 115 has an arcuate, V-shaped or sickle-shaped course. Preferably, the first one-sided target bending line 115 is mirror-symmetrical to a mirror axis running in the width direction.

Preferably, the target bending structure 109 comprises at least a second one-sided target bending line 128. As an example, the second one-sided target bending line 128 has a second front target bending line longitudinal section 129 which, starting from the second lateral edge region 118 opposite the first lateral edge region 117 in the bending direction 111, in particular the second lateral edge, of the shoulder strap resting section 107, extends in the direction towards the imaginary shoulder strap center line 116. The second front target bending line longitudinal section 129 extends diagonally, in particular in an x-y direction. In an exemplary embodiment, the second front target bending line longitudinal section 129 extends at an acute angle, in particular of at most 45 degrees, in an exemplary embodiment of 20 degrees or of 30 degrees, starting from the second lateral edge region 118 diagonally towards the rear in the shoulder strap longitudinal direction 108 and towards the imaginary center line 116.

Preferably, the second one-sided target bending line 128 comprises a second rear target bending line longitudinal section 131 arranged behind the second front target bending line longitudinal section 129 in the shoulder strap longitudinal direction 108, which extends in the direction towards the second lateral edge region 118, in particular towards the second lateral edge. The second rear target bending line longitudinal section 131 extends diagonally, in particular in an x-y direction (in the opposite y direction as the second front target bending line longitudinal section 129). In an exemplary embodiment, the second rear target bending line longitudinal section 131 extends at an acute angle, in particular of at most 45 degrees, in an exemplary embodiment of 20 degrees or of 30 degrees, towards the second lateral edge region 118, in particular the second lateral edge, in particular diagonally towards the rear in the shoulder strap longitudinal direction 108.

Preferably, the second one-sided target bending line 128 has an arcuate, V-shaped or sickle-shaped course. Preferably, the second one-sided target bending line 128 is mirror-symmetrical to a mirror axis running in the width direction.

By way of example, the first one-sided target bending line 115 and the second one-sided target bending line 128 are mirror-symmetrical to one another along the shoulder strap center line 116 as a mirror axis.

In particular, the first one-sided target bending line 115 and the second one-sided target bending line 128 occupy the same longitudinal region of the shoulder strap resting section 107 in the shoulder strap longitudinal direction 108. Preferably, the second one-sided target bending line 128 in the longitudinal direction 108 of the shoulder strap exclusively occupies the longitudinal region of the shoulder strap resting section 107 occupied by the first one-sided target bending line 115.

Preferably, the first one-sided target bending line 115 and the second one-sided target bending line 128 do not cross.

The variant of the target bending structure 109 shown in FIG. 7 will be discussed in more detail below.

Preferably, the first rear target bending line longitudinal section 127 directly adjoins the first front target bending line longitudinal section 125 in the shoulder strap longitudinal direction 108. The first rear target bending line longitudinal section 127 begins exactly where the first front target bending line longitudinal section 125 ends. The first one-sided target bending line 115 has a v-shaped course and is expediently aligned with the opening of the v-shaped course towards the first lateral edge region 117.

Preferably, the second rear target bending line longitudinal section 131 directly adjoins the second front target bending line longitudinal section 129 in the longitudinal direction of the shoulder strap 108. The second rear target bending line longitudinal section 131 begins exactly where the second front target bending line longitudinal section 129 ends. The second one-sided target bending line 128 has a v-shaped course and is expediently aligned with the opening of the v-shaped course towards the second lateral edge region 118.

Optionally, the target bending structure 109 further comprises a transverse connecting target bending line 132 which connects the first one-sided target bending line 115 and the second one-sided target bending line 128 and which expediently extends in the width direction. As an example, the transverse connecting target bending line 132 extends from a first location, in particular a first corner, at which the first front target bending line longitudinal section 125 and the first rear target bending line longitudinal section 127 meet, to a second location, in particular a second corner, at which the second front target bending line longitudinal section 129 and the second rear target bending line longitudinal section 131 meet.

Preferably, the first single-sided target bending line 115 and/or the second single-sided target bending line 128 and/or the transverse connecting target bending line 132 each extend in the width direction over ⅓ or less of the width of the shoulder strap resting section 107.

In particular, the target bending structure 109 has an H-shape, wherein the two rear legs (formed by the first rear target bending line longitudinal section 127 and the second rear target bending line longitudinal section 131) of the H-shape diverge rearwardly in the shoulder strap longitudinal direction 108 and the two front legs of the H-shape (formed by the first front target bending line longitudinal section 125 and the second front target bending line longitudinal section 129) of the H-shape diverge forwardly in the direction opposite to the shoulder strap longitudinal direction 108.

Preferably, the shoulder strap resting section 107 has only the described target bending structure 109 with the described target bending lines 115, 128, 132 and no other target bending lines.

The target bending lines 115, 128, 132 are expediently designed as thinnings of the thickness of the shoulder strap resting section 107.

The target bending line longitudinal sections 125, 127, 129, 131 are expediently designed as straight lines.

The shoulder strap resting section 107 is subdivided by the target bending structure 109 into four resting section segments 141, 142, 143, 144, in particular exactly four resting section segments. A first lateral resting section segment 141 is present, which is exemplarily delimited by the first lateral edge and the first one-sided target bending line 115 and is expediently triangular and/or convex towards the shoulder strap center line 116. A second lateral resting section segment 142 is provided, which is exemplarily delimited by the second lateral edge and the second one-sided target bending line 128 and is expediently triangular and/or convex towards the shoulder strap center line 116. A front resting section segment 143 is provided, which is exemplarily adjacent to the first lateral resting section segment 141 and the second lateral resting section segment 142 and is exemplarily configured as a hexagon. A rear resting section segment 144 is provided, which is exemplarily adjacent to the first lateral resting section segment 141, the second lateral resting section segment 142 and the front resting section segment 143 and is exemplarily designed as a hexagon.

The first lateral resting section segment 141 and/or the second lateral resting section segment 142 in particular each have the shape of an isosceles triangle, the extension of which in the width direction expediently takes up ⅓ of the width of the shoulder strap resting section 107 in each case. The tips of the triangles, which are spaced apart from the lateral edges, are preferably located in the region of the apex of the shoulder.

Expediently, there are no target bending lines within the aforementioned resting section segments.

As an example, the first lateral resting section segment 141 and/or the second lateral resting section segment 142 can be folded up by the elevation movement of the arm 4, in particular with respect to the front resting section segment 143 and/or the rear resting section segment 144, in particular to form the bent shape of the shoulder strap resting section 107.

The variant of the target bending structure 109 shown in FIG. 8 will be discussed in more detail below.

Preferably, the first one-sided target bending line 115 comprises a first straight target bending line longitudinal section 133 arranged in the shoulder strap longitudinal direction 108 between the first front target bending line longitudinal section 125 and the first rear target bending line longitudinal section 127, which first straight target bending line longitudinal section 133 runs parallel to the shoulder strap longitudinal direction.

Preferably, the second one-sided target bending line 128 comprises a second straight target bending line longitudinal section 134, which is arranged in the shoulder strap longitudinal direction 108 between the second front target bending line longitudinal section 129 and the second rear target bending line longitudinal section 131 and runs parallel to the shoulder strap longitudinal direction.

Expediently, the first one-sided target bending line 115 and/or the second one-sided target bending line 128 each have an arcuate or crescent-shaped course. Optionally, the transitions between the longitudinal target bending line sections of the first one-sided target bending line 115 and/or the second one-sided target bending line 128 are each rounded.

Optionally, the target bending structure 109 further comprises a front edge-connecting target bending line 135 and/or a rear edge-connecting target bending line 136, each extending from the first straight target bending line longitudinal section 133 to the first lateral edge and each meeting the first lateral edge at an inner angle 137 of 45 degrees, for example. The front edge-connecting target bending line 135 and the rear edge-connecting target bending line 136 diverge in the direction towards the first lateral edge. By way of example, the front edge connection target bending line 135 and the rear edge connection target bending line 136 are mirror-symmetrical with respect to a mirror axis extending in the width direction.

Preferably, the first one-sided target bending line 115 and/or the second one-sided target bending line 128 each extend in the width direction over ⅓ or less of the width of the shoulder strap resting section 107.

Preferably, the shoulder strap resting section 107 has only the described target bending structure 109 with the described target bending lines 115, 128, 135, 136 and no other target bending lines.

The target bending lines 115, 128, 135, 136 are expediently designed as thinning of the thickness of the shoulder strap resting section 107.

The target bending line longitudinal sections 125, 127, 129, 131, 133, 134 can be designed as straight lines.

The shoulder strap resting section 107 is subdivided by the target bending structure 109 into three resting section segments 141, 142, 145, in particular exactly three resting section segments. In the (optional) presence of the edge connection target bending lines 135, 136, the shoulder strap resting section 107 is subdivided into exactly five resting section segments.

A first lateral resting section segment 141 is provided, which is exemplarily delimited by the first lateral edge and the first one-sided target bending line 115 and is expediently convex towards the shoulder strap center line 116. A second lateral resting section segment 142 is provided, which is exemplarily delimited by the second lateral edge and the second one-sided target bending line 128 and is expediently convex towards the shoulder strap center line 116. A central resting section segment 145 is provided, which is exemplarily adjacent to the first lateral resting section segment 141 via the first one-sided target bending line 115 and adjacent to the second lateral resting section segment 142 via the second one-sided target bending line 128.

Expediently, no target bending lines are present within the aforementioned resting section segments—in particular apart from the optionally present edge connection target bending lines 135, 136.

As an example, the first lateral resting section segment 141 and/or the second lateral resting section segment 142 can be folded up by the elevation movement of the arm 4, in particular with respect to the central resting section segment 145, in order to form in particular the bent shape of the shoulder strap resting section 107.

In the following, the variant of the target bending structure 109 shown in FIG. 9 will be discussed in more detail.

Preferably, the first rear target bending line longitudinal section 127 directly adjoins the first front target bending line longitudinal section 125 in the shoulder strap longitudinal direction 108. The first rear target bending line longitudinal section 127 begins exactly where the first front target bending line longitudinal section 125 ends. The first one-sided target bending line 115 has an arcuate or crescent-shaped course and is expediently aligned with the opening of the arcuate or crescent-shaped course towards the first lateral edge region 117.

Preferably, the second rear target bending line longitudinal section 131 directly adjoins the second front target bending line longitudinal section 129 in the longitudinal direction of the shoulder strap 108. The second rear target bending line longitudinal section 131 begins exactly where the second front target bending line longitudinal section 129 ends. The second one-sided target bending line 128 has an arcuate or crescent-shaped course and is expediently aligned with the opening of the arcuate or crescent-shaped course towards the second lateral edge region 118.

Optionally, the target bending structure 109 further has a straight target bending line 146 which runs parallel to the shoulder strap longitudinal direction 108, in particular from the front edge to the rear edge and, by way of example, lies on the imaginary shoulder strap center line 116.

As an example, the first one-sided target bending line 115 and/or the second one-sided target bending line 128 each extend in the width direction as far as the straight target bending line 146 and/or the shoulder strap center line 116. In particular, the first one-sided target bending line 115 and/or the second one-sided target bending line 128 are tangent to each other in the middle.

Optionally, the transitions between the target bending line longitudinal sections of the first single-sided target bending line 115 and/or the second single-sided target bending line 128 are each rounded.

Preferably, the shoulder strap resting section 107 has only the described target bending structure 109 with the described target bending lines 115, 128, 146 and no other target bending lines.

The target bending lines 115, 128, 146 are expediently designed as thinnings of the thickness of the shoulder strap resting section 107.

The longitudinal sections 125, 127, 129, 131 of the target bending lines can expediently be designed as straight lines.

The shoulder strap resting section 107 is subdivided by the target bending structure 109 into six resting section segments 141, 142, 147, 148, 149, 151, in particular exactly six resting section segments. A first lateral resting section segment 141 is present, which is exemplarily delimited by the first lateral edge and the first one-sided target bending line 115 and is expediently convex towards the shoulder strap center line 116. A second lateral resting section segment 142 is provided, which is exemplarily delimited by the second lateral edge and the second one-sided target bending line 128 and is expediently convex towards the shoulder strap center line 116. A first front resting section segment 147 is provided, which is exemplarily adjacent to the first lateral resting section segment 141. A second front resting section segment 148 is provided, which is exemplarily adjacent to the second lateral resting section segment 142 and adjacent to the first front resting section segment 147. A first rear resting section segment 149 is provided, which is exemplarily adjacent to the first lateral resting section segment 141. A second rear resting section segment 151 is present, which is exemplarily adjacent to the second lateral resting section segment 142 and adjacent to the first rear resting section segment 149.

Expediently, there are no target bending lines within the aforementioned resting section segments.

As an example, the first lateral resting section segment 141 and/or the second lateral resting section segment 142 can be folded up by the elevation movement of the arm 4, in particular with respect to the front resting section segments 147, 148 and/or the rear resting section segments 149, 151, in order to form in particular the bent shape of the shoulder strap resting section 107.

Figure 10:
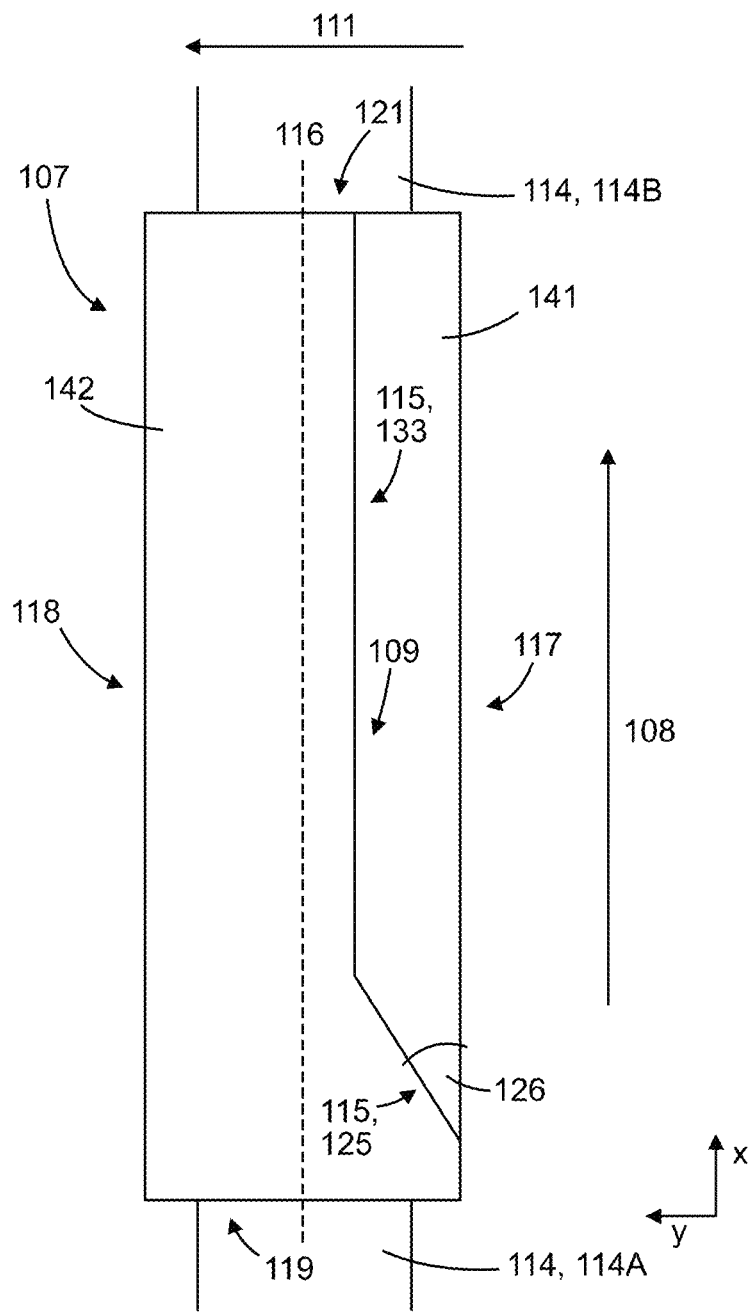

The variant of the target bending structure 109 shown in FIG. 10 will be discussed in more detail below.

Preferably, the first one-sided target bending line 115 has a first front target bending line longitudinal section 125 which, starting from the first lateral edge region 117, in particular the first lateral edge, of the shoulder strap resting section 107, extends in the direction towards the imaginary shoulder strap center line 116 which is located centrally on the shoulder strap resting section 107 in the bending direction 111 and extends in the shoulder strap longitudinal direction 108. The first front target bending line longitudinal section 125 extends diagonally, in particular in an x-y direction. In an exemplary embodiment, the first front target bending line longitudinal section 125 extends at an acute angle 126, in particular of at most 45 degrees, in an exemplary embodiment of 20 degrees or of 30 degrees, starting from the first lateral edge region 117 diagonally to the rear in the shoulder strap longitudinal direction 108 and towards the imaginary center line 116.

Preferably, the first front target bending line longitudinal section 125 extends in the width direction over less than half, preferably over ⅓ or less, of the width of the shoulder strap resting section 107.

Preferably, the first front target bending line longitudinal section 125 lies outside a region of the shoulder apex.

Preferably, the first one-sided target bending line 115 has a first straight target bending line longitudinal section 133 arranged behind the first front target bending line longitudinal section 125 in the shoulder strap longitudinal direction 108, which first straight target bending line longitudinal section 133 runs parallel to the shoulder strap longitudinal direction 108. By way of example, the first straight target bending line longitudinal section 133 extends to the rear edge region 121, in particular to the rear edge, of the shoulder strap resting section 107.

Preferably, the first straight target bending line longitudinal section 133 directly adjoins the first front target bending line longitudinal section 125 in the shoulder strap longitudinal direction 108. The first straight target bending line longitudinal section 133 begins exactly where the first front target bending line longitudinal section 125 ends. The first one-sided target bending line 115 has an hockey stick-shaped course, for example.

Preferably, the first one-sided target bending line 115 extends in the width direction over less than half, preferably over ⅓ or less, of the width of the shoulder strap resting section 107.

Preferably, the shoulder strap resting section 107 has only the described target bending structure 109 with the described target bending line 115 and no other target bending lines.

The target bending line 115 is expediently designed as a thinning of the thickness of the shoulder strap resting section 107.

The target bending line longitudinal sections 125, 133 are expediently designed as straight lines.

The shoulder strap resting section 107 is divided by the target bending structure 109 into two resting section segments 141, 142, in particular exactly two resting section segments. A first lateral resting section segment 141 is present, which is exemplarily delimited by the first lateral edge and the first one-sided target bending line 115 and optionally the rear edge, and in particular occupies ⅓ of the width of the shoulder strap resting section 107. A second lateral resting section segment 142 is present, which is exemplarily delimited by the second lateral edge and the first one-sided target bending line 115 and optionally by the rear edge, front edge and/or first lateral edge, and in particular occupies ⅔ of the width of the shoulder strap resting section 107.

Expediently, there are no target bending lines within the aforementioned resting section segments.

Optionally, the transition between the target bending line longitudinal sections 125, 133 can be rounded.

As an example, the first lateral resting section segment 141 can be folded up by the elevation movement of the arm 4, in particular with respect to the second lateral resting section segment 142, in particular to form the bent shape of the shoulder strap resting section 107.

Preferably, the shoulder strap resting section 107 is wider than the strap section 114, in particular the rear strap section 114B. As an example, the shoulder strap resting portion 107 protrudes laterally to the left and right beyond the strap section 114, in particular the rear strap section 114B, in particular at a contact point between the shoulder strap resting portion 107 and the strap section 114, in particular the rear strap section 114B.

By way of example, the first one-sided target bending line 115, in particular the rear target bending line longitudinal section 133, opens out at the rear edge region 121, preferably at a y-position which lies between the y-positions of the two lateral edges (extending in the shoulder strap longitudinal direction 108) of the rear strap section 114B.

Figure 11:
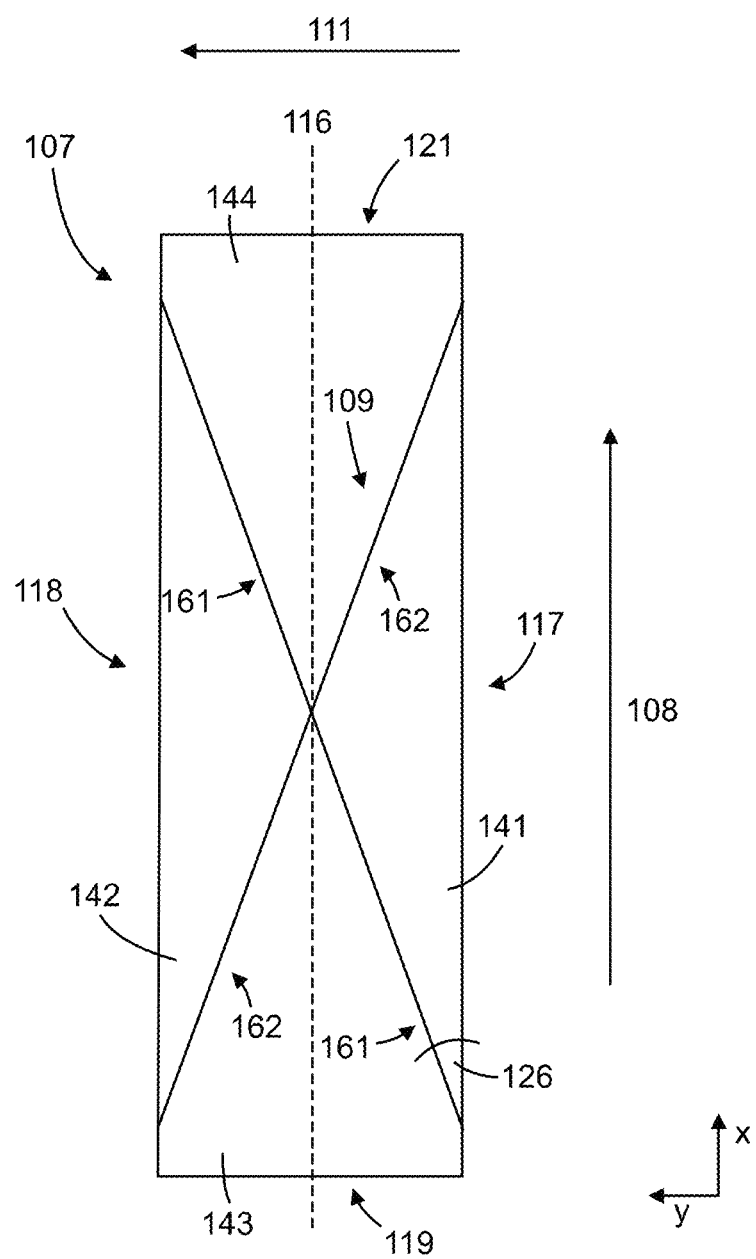

In the following, the variant of the target bending structure 109 shown in FIG. 11 will be discussed in more detail.

Preferably, the target bending structure 109 comprises a first crossing target bending line 161, which extends from the first lateral edge region 117, in particular the first lateral edge, of the shoulder strap resting section 107, crossing the imaginary shoulder strap center line 116 lying centrally on the shoulder strap resting section 107 in the bending direction 111 and extending in the longitudinal direction 108, to the second lateral edge region 118, in particular the second lateral edge, of the shoulder strap resting section 107, wherein the second lateral edge region 118 is opposite to the first lateral edge region 117, in particular the first lateral edge in the bending direction 111. Preferably, the first crossing target bending line 161 is a straight line and, in particular, runs diagonally across the shoulder strap resting section 107.

Preferably, the target bending structure 109 comprises a second crossing target bending line 162, which extends from the second lateral edge region 118, in particular the second lateral edge, of the shoulder strap resting section 107, crossing the imaginary shoulder strap center line 116, to the first lateral edge region 117, in particular the first lateral edge, of the shoulder strap resting section 107. Preferably, the second crossing target bending line 162 is a straight line and, in particular, runs diagonally across the shoulder strap resting section 107.

By way of example, the first crossing target bending line 161 and the second crossing target bending line 162 intersect, in particular on the shoulder strap center line 116. The target bending structure 109 has in particular an X-shape.

Preferably, the shoulder strap resting section 107 has only the described target bending structure 109 with the described target bending lines 161, 162 and no other target bending lines.

The target bending lines 161, 162 are expediently designed as thinnings of the thickness of the shoulder strap resting section 107.

The shoulder strap resting section 107 is divided by the target bending structure 109 into four resting section segments 141, 142, 143, 144, in particular exactly four resting section segments. A first lateral resting section segment 141 is present, which is exemplarily delimited by the first lateral edge and the first crossing target bending line 161 and the second crossing target bending line 162 and is expediently triangular and/or convex towards the shoulder strap center line 116. A second lateral resting section segment 142 is provided, which is exemplarily defined by the second lateral edge and the first crossing target bending line 161 and the second crossing target bending line 162 and is expediently triangular and/or convex towards the shoulder strap centerline 116. A front resting section segment 143 is provided, which is exemplarily adjacent to the first lateral resting section segment 141 and the second lateral resting section segment 142 and is exemplarily configured as a pentagon. A rear resting section segment 144 is provided, which is exemplarily adjacent to the first lateral resting section segment 141, the second lateral resting section segment 142 and the front resting section segment 143 and is exemplarily designed as a pentagon.

Expediently, there are no target bending lines within the aforementioned resting section segments.

As an example, the first lateral resting section segment 141 and/or the second lateral resting section segment 142 can be folded up by the elevation movement of the arm 4, in particular with respect to the front resting section segment 143 and/or the rear resting section segment 144, in particular to form the bent shape of the shoulder strap resting section 107.

Figure 12:
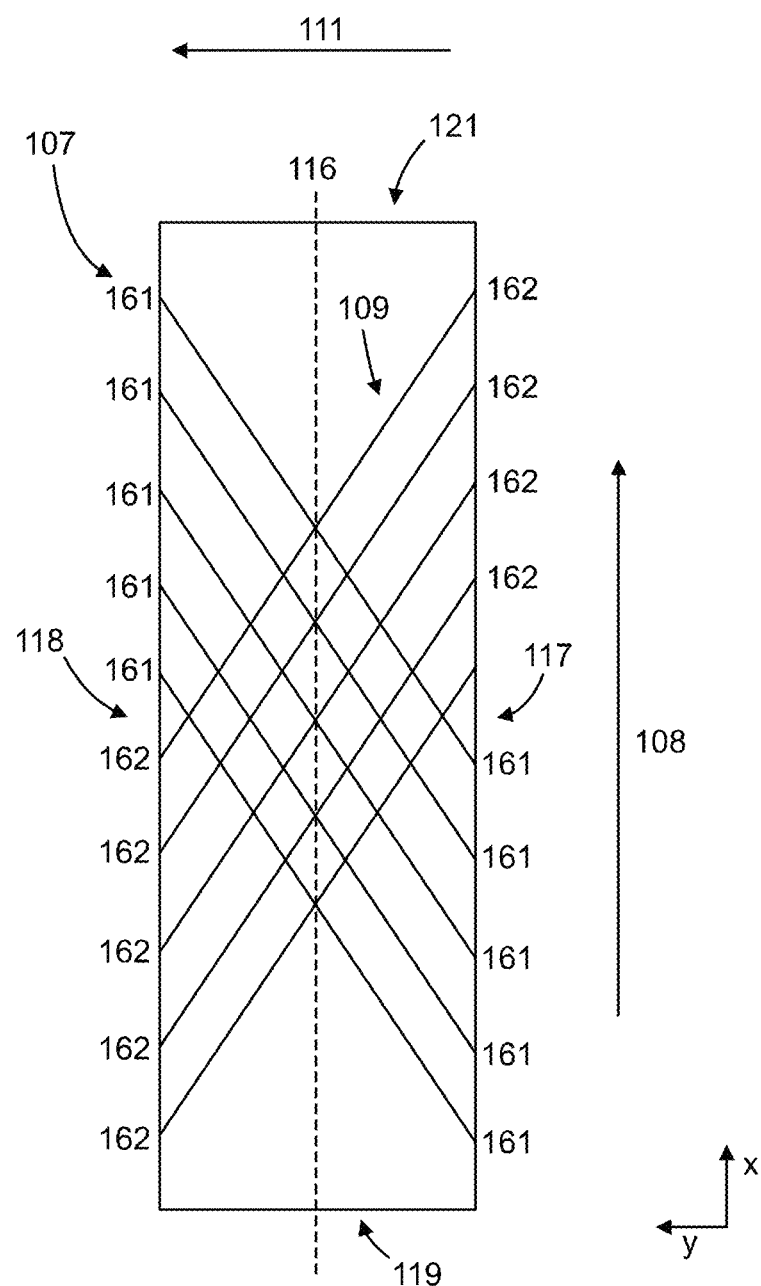

The variant of the target bending structure 109 shown in FIG. 12 will be discussed in more detail below.

The target bending structure 109 comprises a plurality of first crossing target bending lines 161 running parallel to one another, which extend in a first diagonal direction from the first lateral edge region 117, in particular the first lateral edge, of the shoulder strap resting section 107 to the second lateral edge region 118, in particular the second lateral edge, of the shoulder strap resting section 107 opposite the first lateral edge region 117, in particular the first lateral edge, in the bending direction 111. The target bending structure 109 further comprises a plurality of second crossing target bending lines 162 extending parallel to each other, which extend in a second diagonal direction from the second lateral edge region 118, in particular the second lateral edge, to the first lateral edge region 117, in particular the first lateral edge, and cross the first crossing target bending lines. The y-component of the second diagonal direction is expediently opposite to the y-component of the first diagonal direction. By way of example, each first crossing target bending line 161 crosses each second crossing target bending line 162 and/or each second crossing target bending line 162 crosses each first crossing target bending line 161.

Preferably, the shoulder strap resting section 107 has only the described target bending structure 109 with the described target bending lines 161, 162 and no other target bending lines.

The target bending lines 161, 162 are expediently designed as thinnings of the thickness of the shoulder strap resting section 107 and/or are designed as straight lines.

Figure 13:
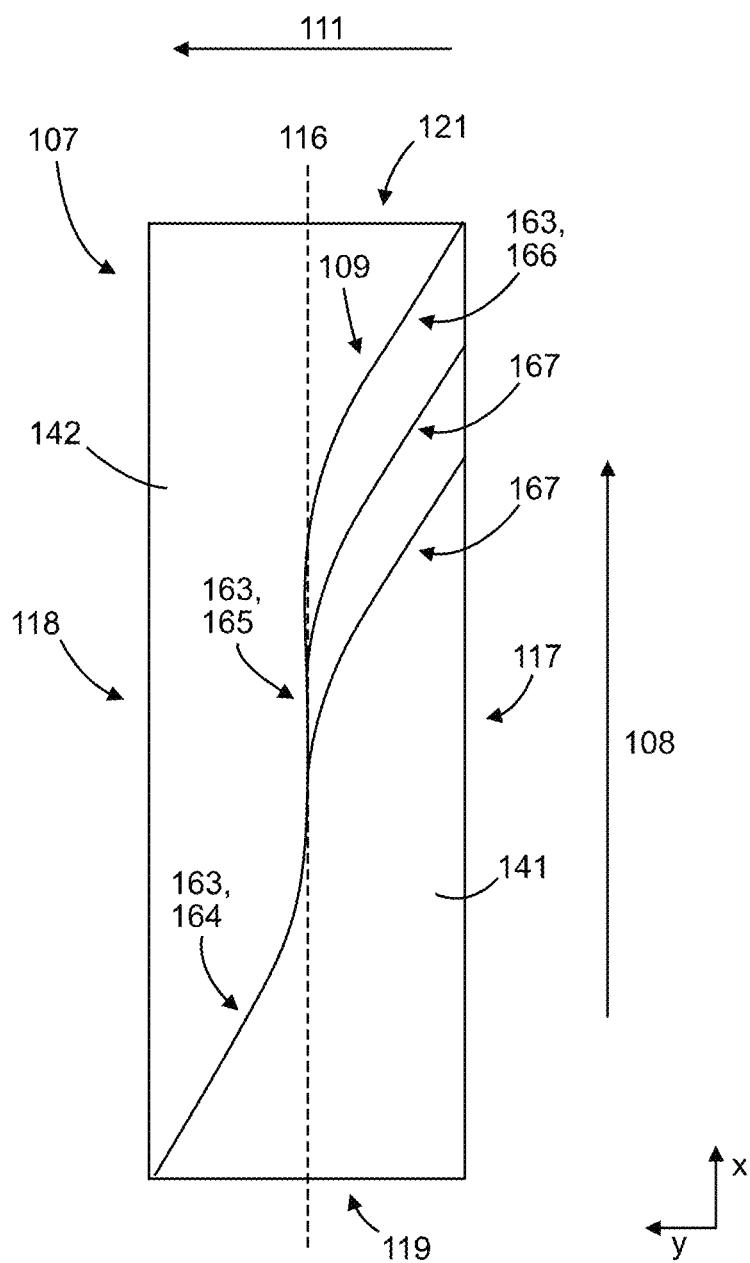

In the following, the variant of the target bending structure 109 shown in FIG. 13 will be discussed in more detail.

Preferably, the target bending structure 109 comprises a crossing target bending line 163, which extends from the second lateral edge region 118, in particular the second lateral edge, of the shoulder strap resting section 107, crossing the imaginary shoulder strap center line 116 lying centrally on the shoulder strap resting section 107 in the bending direction 111 and extending in the longitudinal direction 108, to the first lateral edge region 117, in particular the first lateral edge, of the shoulder strap resting section 107, wherein the first lateral edge region 117 is opposite to the second lateral edge region 118, in particular the second lateral edge, in the bending direction 111. The crossing target bending line 163 has in particular an S-shaped course.

In an exemplary embodiment, the crossing target bending line 163 has a front target bending line longitudinal section 164 which, in an exemplary embodiment, extends from the second lateral edge region 118, in particular the second lateral edge, towards the imaginary shoulder strap center line 116. In an exemplary embodiment, the front target bending line longitudinal section 164 extends at an acute angle, in particular 30 degrees, relative to the second lateral edge, in particular towards the rear. In an exemplary embodiment, the crossing target bending line 163 has a central target bending line longitudinal section 165 which, in an exemplary embodiment, starting from the front target bending line longitudinal section 164, extends rearwardly along the imaginary shoulder strap center line 116 in the shoulder strap longitudinal direction 108. Exemplarily, the crossing target bending line 163 has a rear target bending line longitudinal section 166, which exemplarily extends starting from the central target bending line longitudinal section 165 towards the first lateral edge region 117, in particular the first lateral edge. By way of example, the rear target bending line longitudinal section 166 and the first lateral edge meet at an acute angle, in particular 30 degrees.

Preferably, the shoulder strap resting section 107 has only the described target bending structure 109 with the described target bending line 163 and no other target bending lines.

The target bending line 163 is expediently designed as a thinning of the thickness of the shoulder strap resting section 107.

Optionally, the transitions between the target bending line longitudinal sections 163, 165, 166 are each rounded.

The longitudinal sections 164, 165, 166 of the target bending lines can expediently be designed as straight lines.

The shoulder strap resting section 107 is divided into two resting section segments 141, 142 by the target bending structure 109. A first lateral resting section segment 141 is present, which is exemplarily delimited by the first lateral edge, the crossing target bending line 163 and the front edge region 119. A second lateral resting section segment 142 is present, which is exemplarily delimited by the second lateral edge, the crossing target bending line 163 and the rear edge region 121.

Optionally, the target bending structure 109 further comprises one or more, exemplarily exactly two, edge connecting target bending lines 167. Each edge connecting target bending line 167 extends from the central target bending line longitudinal section 165 to the first lateral edge and is expediently parallel to the rear target bending line longitudinal section 166.

Within the aforementioned resting section segments, there are expediently no target bending lines (with the exception of the optionally available edge connection target bending lines 167).

As an example, the first lateral resting section segment 141 and/or the second lateral resting section segment 142 can be folded up by the elevation movement of the arm 4, in particular relative to one another, in order to form in particular the bent shape of the shoulder strap resting section 107.

Figure 14:
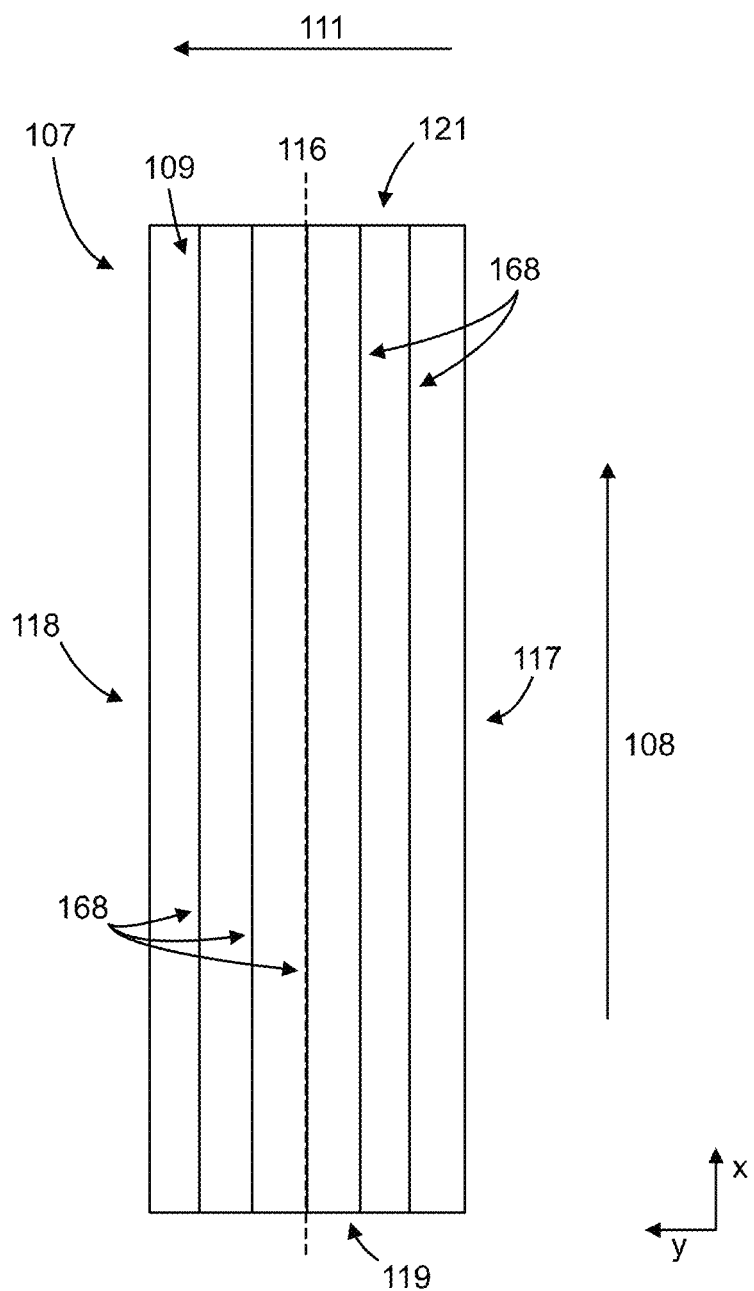

The variant of the target bending structure 109 shown in FIG. 14 will be discussed in more detail below.

Preferably, the target bending structure 109 comprises a plurality of parallel target bending lines 168 running parallel to the longitudinal direction 108 of the shoulder strap. As an example, the parallel target bending lines 168 run from the front edge region 119, in particular the front edge, to the rear edge region 121, in particular the rear edge.

Preferably, the shoulder strap resting section 107 has only the described target bending structure 109 with the described target bending lines 168 and no other target bending lines.

The target bending line 168 is expediently designed as a thinning of the thickness of the shoulder strap resting section 107.

The parallel target bending lines 168 divide the shoulder strap resting section 107 into a plurality of resting section segments running parallel to each other in the longitudinal direction 108 of the shoulder strap.

Preferably, the different target bending lines of the variants of the target bending structure 109 discussed above can be combined with each other to form further variants.

In particular, the wearing device 50 can be operated by a method in which the elevation movement of the user's arm 4 is performed, thereby causing the formation of the user's shoulder hollow 112, so that the shoulder resting section 107 is bent in the bending direction 111 to assume the bent shape corresponding to the shoulder hollow 112 and thus lie in an area-contacting manner against the user in the shoulder hollow 112.

As an example, the user performs an overhead activity with his arm 4 pointing upwards, in particular with a tool.

Furthermore, the method may involve a lowering movement of the arm 4 so that the arm 4 is no longer oriented upwardly and the shoulder hollow 112 is no longer present, so that the shoulder resting section 107 is moved from the bent shape to a flat shape (in particular in the width direction) in which, expediently, no resting section segment is folded up.

The invention claimed is:

1. A wearing device, which is an exoskeleton for wearing on the human body, comprising a shoulder strap with a shoulder strap resting section for resting on a shoulder of a user, the shoulder strap resting section having a predetermined target bending structure extending in the longitudinal direction of the shoulder strap for reducing a bending stiffness of the shoulder strap resting section in a bending direction transverse to the longitudinal direction of the shoulder strap, so that the shoulder strap resting section, in a state resting on the user's shoulder, can be bent in the bending direction by an elevation movement of an arm of the user and a thus resulting formation of a shoulder hollow of the user, in order to assume a bent shape corresponding to the shoulder hollow and thus rest in an area-contacting manner against the user in the shoulder hollow,
wherein the target bending structure comprises at least a first one-sided target bending line, which has a first front target bending line longitudinal section, which, starting from a first lateral edge region of the shoulder strap resting section, extends in the direction of an imaginary shoulder strap center line which is located centrally in the bending direction on the shoulder strap resting section and extends in the longitudinal direction of the shoulder strap.

2. The wearing device according to claim 1, wherein the wearing device comprises a base section comprising the shoulder strap for attachment to the torso of the human body, a support section movably coupled to the base section for supporting the arm of the human body and an actuator device acting on the support section for providing a support force for the arm.

3. The wearing device according to claim 1, wherein the target bending structure comprises one or more target bending lines.

4. The wearing device according to claim 1, wherein the first one-sided target bending line has, arranged behind the first front target bending line longitudinal section in the shoulder strap longitudinal direction, a first rear target bending line longitudinal section, which extends in the direction towards the first lateral edge region.

5. The wearing device according to claim 1, wherein the first one-sided target bending line has an arcuate, v-shaped or sickle-shaped course.

6. The wearing device according to claim 1, wherein the first one-sided target bending line comprises a first straight target bending line longitudinal section arranged behind the first front target bending line longitudinal section in the shoulder strap longitudinal direction, which first straight target bending line longitudinal section runs parallel to the shoulder strap longitudinal direction.

7. The wearing device according to claim 1, wherein the one-sided target bending line does not cross the shoulder strap center line.

8. The wearing device according to claim 1, wherein the target bending structure comprises at least a second one-sided target bending line, which has a second front target bending line longitudinal section, which, starting from a second lateral edge region of the shoulder strap resting section opposite the first lateral edge region in the bending direction, extends in the direction towards the imaginary shoulder strap center line.

9. The wearing device according to claim 8, wherein the second one-sided target bending line has a second rear target bending line longitudinal section arranged behind the second front target bending line longitudinal section in the shoulder strap longitudinal direction, which second rear target bending line longitudinal section extends in the direction towards the second lateral edge region.

10. The wearing device according to claim 8, wherein the second one-sided target bending line has an arcuate, v-shaped or sickle-shaped course.

11. The wearing device according to claim 8, wherein the first one-sided target bending line and the second one-sided target bending line occupy the same longitudinal region of the shoulder strap resting section in the longitudinal direction of the shoulder strap.

12. The wearing device according to claim 8, wherein the first one-sided target bending line and the second one-sided target bending line do not cross each other.

13. The wearing device according to claim 1, wherein the target bending structure has at least a first crossing target bending line, which runs from a first lateral edge region of the shoulder strap resting section, crossing an imaginary shoulder strap center line positioned in the bending direction centrally on the shoulder strap resting section and running in the longitudinal direction of the shoulder strap, to a second lateral edge region of the shoulder strap resting section opposite the first lateral edge region in the bending direction.

14. The wearing device according to claim 13, wherein the first crossing target bending line has an S-shaped or a diagonal course.

15. A wearing device, which is an exoskeleton and/or comprises a tool, for wearing on the human body, comprising a shoulder strap with a shoulder strap resting section for resting on a shoulder of a user, the shoulder strap resting section having a predetermined target bending structure extending in the longitudinal direction of the shoulder strap for reducing a bending stiffness of the shoulder strap resting section in a bending direction transverse to the longitudinal direction of the shoulder strap, so that the shoulder strap resting section, in a state resting on the user's shoulder, can be bent in the bending direction by an elevation movement of an arm of the user and a thus resulting formation of a shoulder hollow of the user, in order to assume a bent shape corresponding to the shoulder hollow and thus rest in an area-contacting manner against the user in the shoulder hollow, wherein the target bending structure comprises a plurality of first crossing target bending lines running parallel to each other and running in a first diagonal direction from a first lateral edge region of the shoulder strap resting section to a second lateral edge region of the shoulder strap resting section opposite the first lateral edge region in the bending direction, and a plurality of second crossing target bending lines running parallel to each other and running in a second diagonal direction from the second lateral edge region to the first lateral edge region of the shoulder strap resting section, and crossing the first crossing target bending lines, wherein the lateral edges extend in the longitudinal direction of the shoulder strap.

16. The wearing device according to claim 1, wherein the target bending structure comprises a plurality of parallel target bending lines running parallel to the longitudinal direction of the shoulder strap.

17. The wearing device according to claim 1, wherein the target bending structure comprises, for reducing the bending stiffness, thinning, perforations, seams and/or plastic deformations.

18. The wearing device according to claim 1, wherein the shoulder strap comprises piping extending in the longitudinal direction and at least one target bending section arranged between the piping, which has a reduced bending stiffness compared to the piping and forms at least part of the target bending structure.

19. A method of operating a wearing device according to claim 1, comprising the step of: performing the elevation movement of the user's arm and thereby causing the user's shoulder hollow to be formed so that the shoulder strap resting section is bent in the bending direction to assume the bent shape corresponding to the shoulder hollow and thus to rest in an area-contacting manner against the user in the shoulder hollow.

20. A wearing device, which is an exoskeleton and/or comprises a tool, for wearing on the human body, comprising a shoulder strap with a shoulder strap resting section for resting on a shoulder of a user, the shoulder strap resting section having a predetermined target bending structure extending in the longitudinal direction of the shoulder strap for reducing a bending stiffness of the shoulder strap resting section in a bending direction transverse to the longitudinal direction of the shoulder strap, so that the shoulder strap resting section, in a state resting on the user's shoulder, can be bent in the bending direction by an elevation movement of an arm of the user and a thus resulting formation of a shoulder hollow of the user, in order to assume a bent shape corresponding to the shoulder hollow and thus rest in an area-contacting manner against the user in the shoulder hollow, wherein the target bending structure comprises at least a first crossing target bending line running in a first diagonal direction from a first lateral edge region of the shoulder strap resting section to a second lateral edge region of the shoulder strap resting section opposite the first lateral edge region in the bending direction, and at least one second crossing target bending line running in a second diagonal direction from the second lateral edge region to the first lateral edge region of the shoulder strap resting section, and crossing the first crossing target bending line, wherein the lateral edges extend in the longitudinal direction of the shoulder strap.

* * * * *